United States Patent
Nakamura

(10) Patent No.: US 8,687,250 B2
(45) Date of Patent: Apr. 1, 2014

(54) IMAGE READING APPARATUS AND IMAGE CONTROL METHOD OF IMAGE READING APPARATUS, AND STORAGE MEDIUM

(75) Inventor: Yasuyuki Nakamura, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 122 days.

(21) Appl. No.: 13/016,913

(22) Filed: Jan. 28, 2011

(65) Prior Publication Data

US 2011/0194161 A1 Aug. 11, 2011

(30) Foreign Application Priority Data

Feb. 10, 2010 (JP) ................................. 2010-027918

(51) Int. Cl.
- H04N 1/46 (2006.01)
- H04N 1/04 (2006.01)
- G06K 9/00 (2006.01)
- G06K 9/40 (2006.01)

(52) U.S. Cl.
USPC ........... 358/514; 358/475; 358/509; 382/167; 382/254

(58) Field of Classification Search
None
See application file for complete search history.

(56) References Cited

U.S. PATENT DOCUMENTS

| 5,592,576 | A | * | 1/1997 | Hayashi | 382/318 |
| 7,620,360 | B2 | * | 11/2009 | Heydinger et al. | 399/374 |
| 2006/0140468 | A1 | * | 6/2006 | Holl | 382/135 |
| 2006/0256398 | A1 | * | 11/2006 | Ishimaru et al. | 358/461 |
| 2009/0323142 | A1 | * | 12/2009 | Moore et al. | 358/497 |

FOREIGN PATENT DOCUMENTS

JP 2001-320557 A 11/2001

* cited by examiner

Primary Examiner — Mark K Zimmerman
Assistant Examiner — John Wallace
(74) Attorney, Agent, or Firm — Canon USA, Inc., IP Division

(57) ABSTRACT

An image reading apparatus includes a first reading unit, a second reading unit, and a determination unit. The first reading unit reads an image on a first side of a document conveyed through a document conveyance path. The second reading unit is disposed in the document conveyance path at a reading position that is different from a reading position of the first reading unit and reads an image on a second side that is different from the first side on the document. The determination unit determines whether the document is a color document, according to whether a color image is included in an image in a predetermined region of the first side read by the first reading unit, and in an image in a region that is different from the predetermined region in the first side and read by the second reading unit.

8 Claims, 20 Drawing Sheets

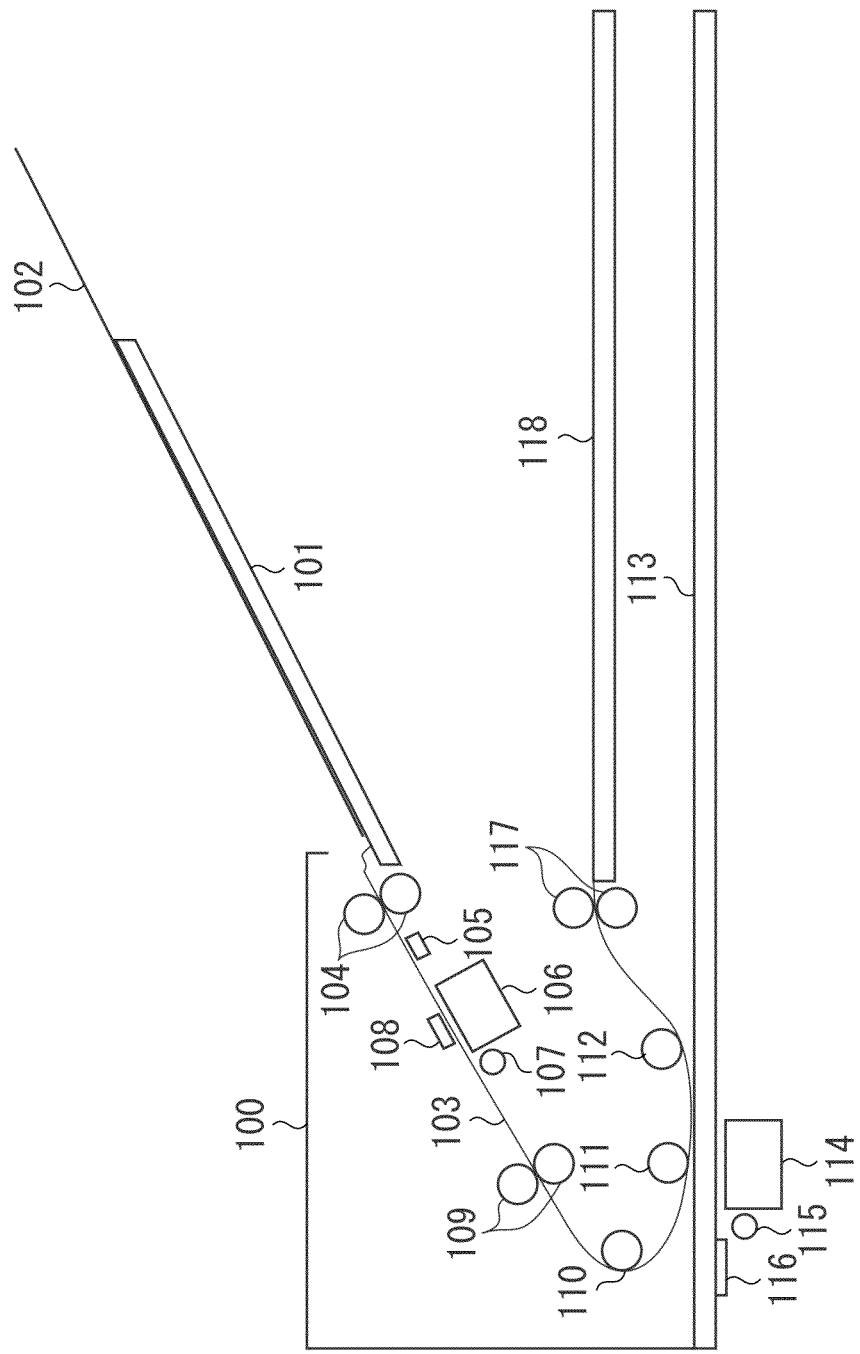

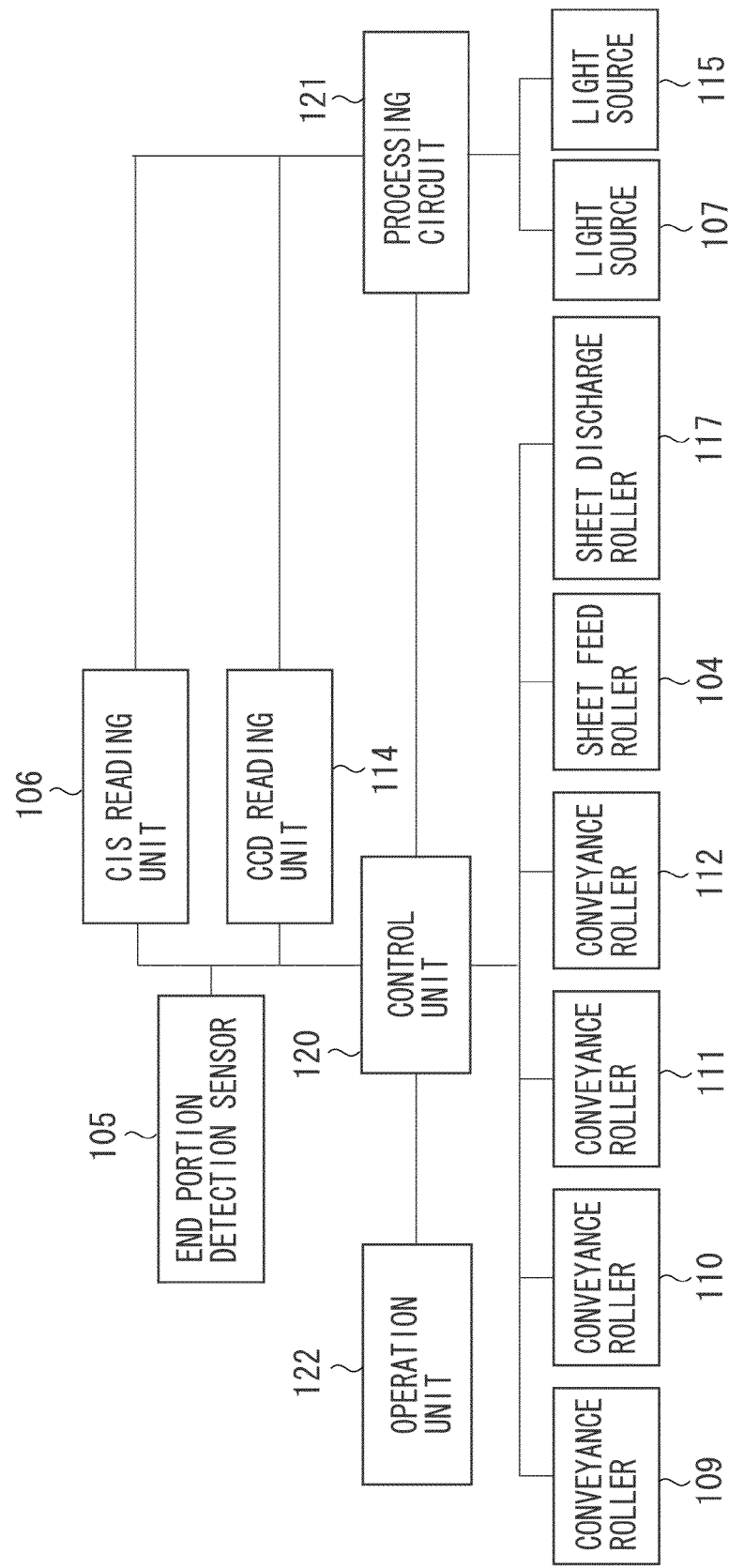

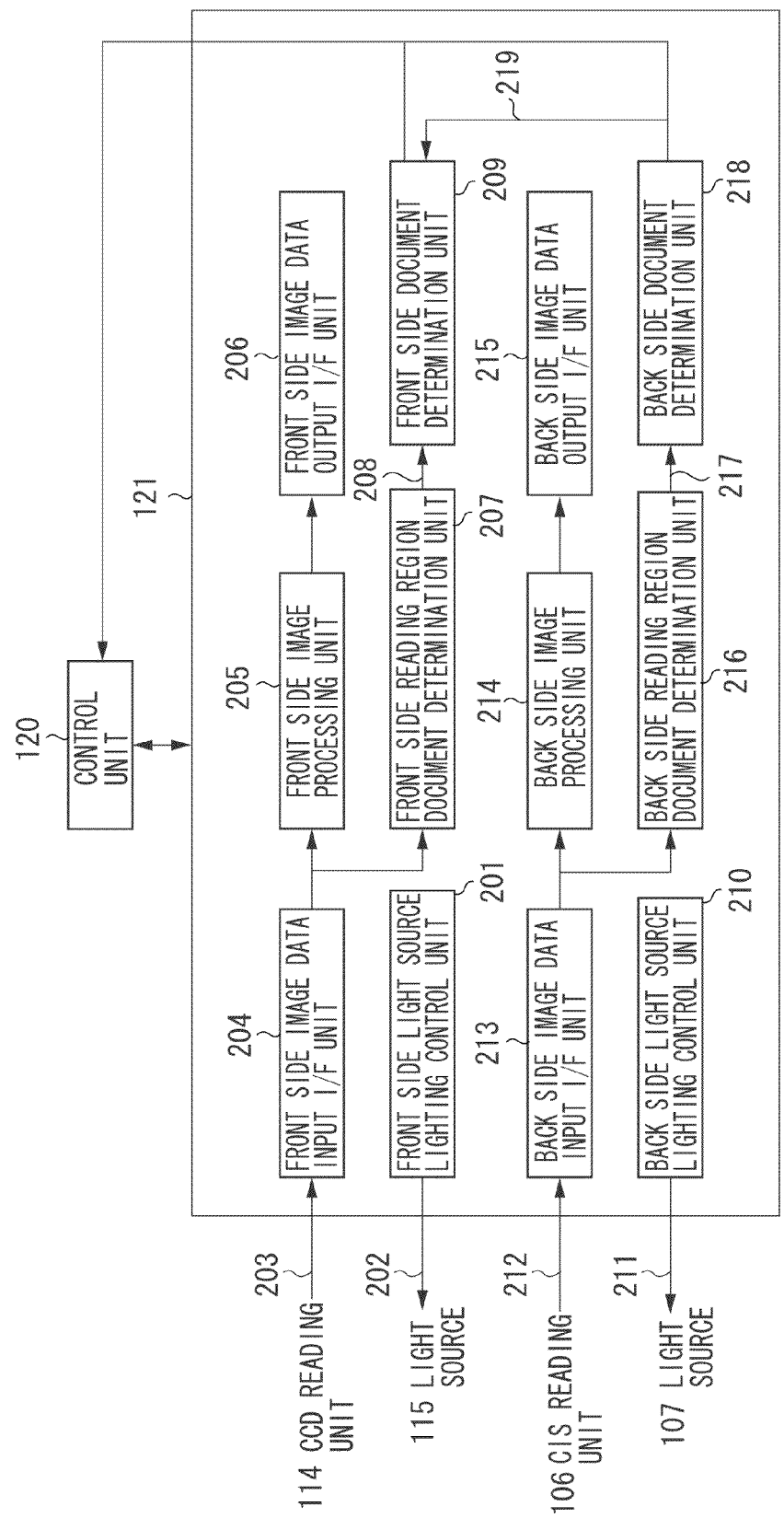

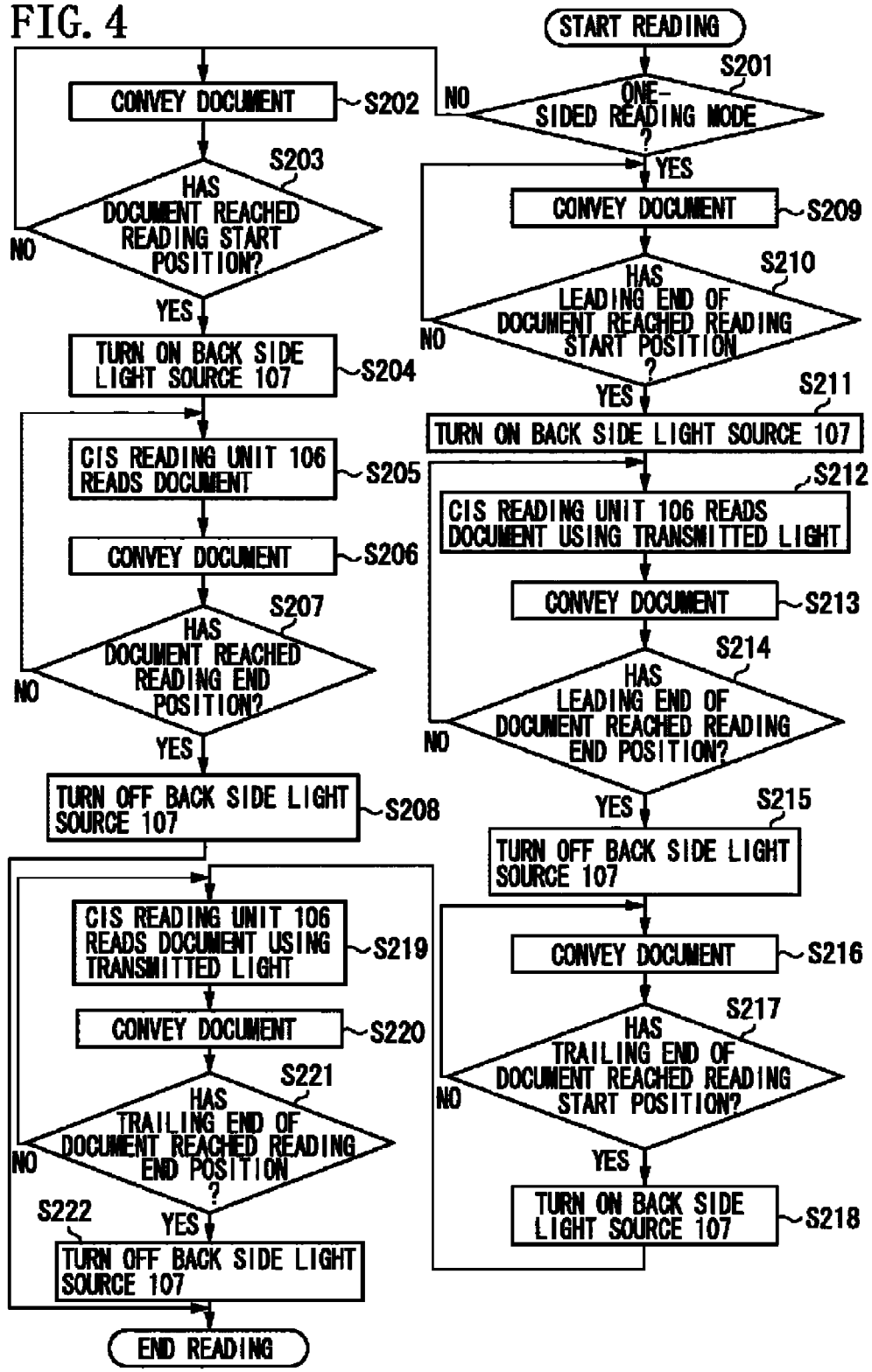

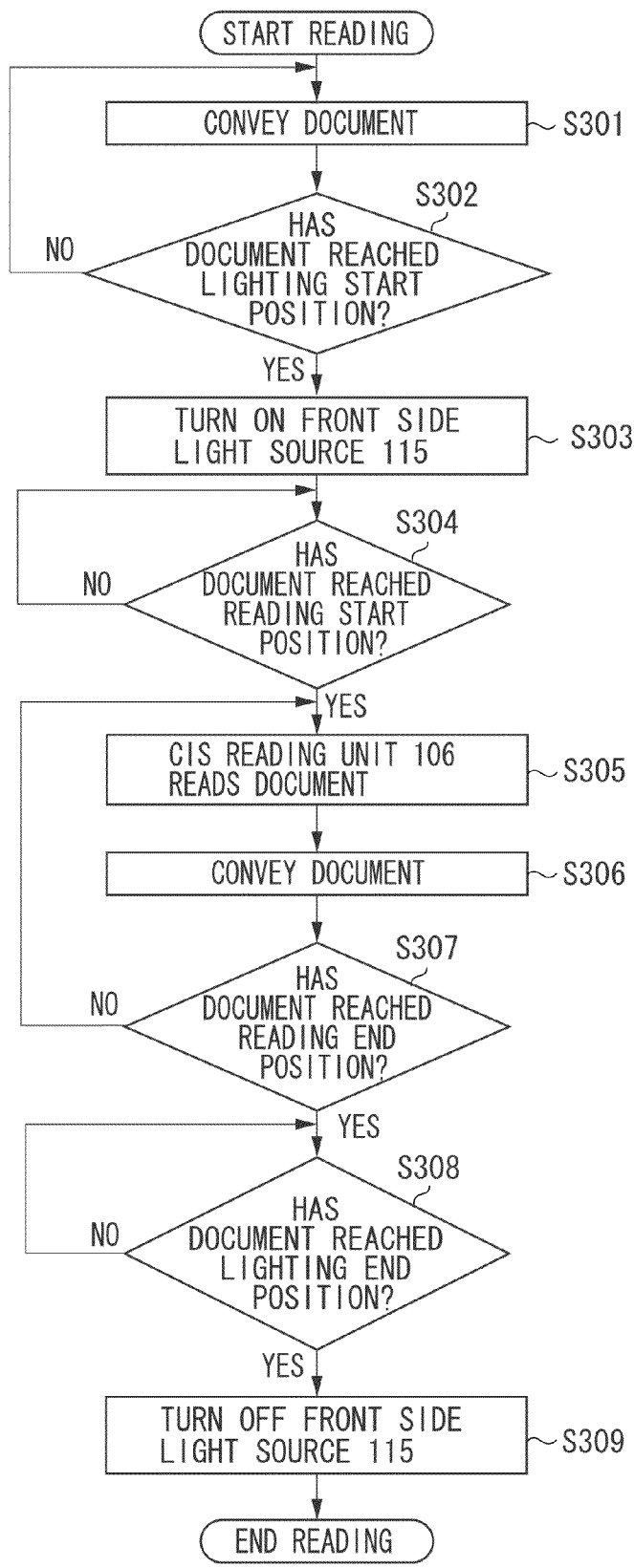

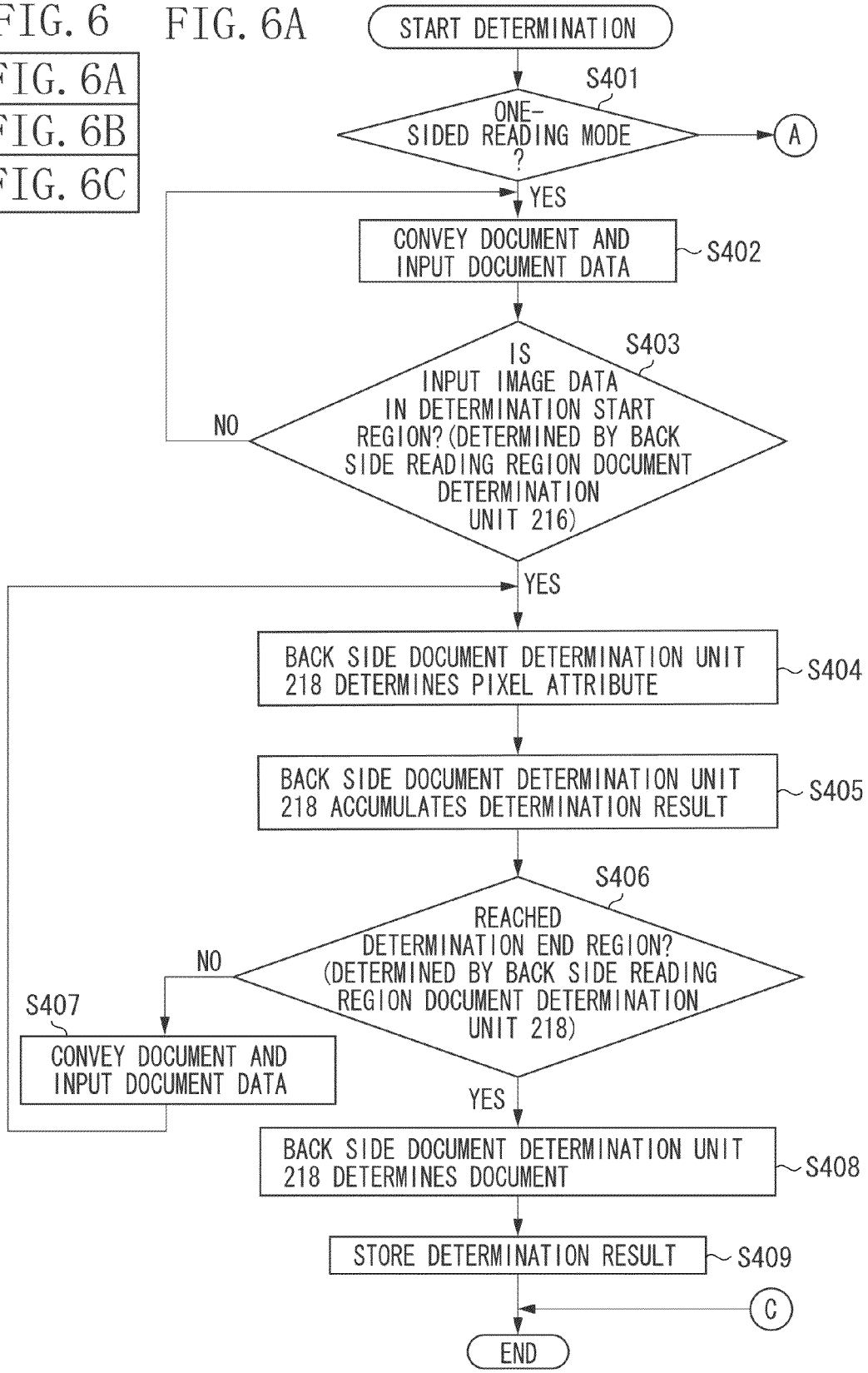

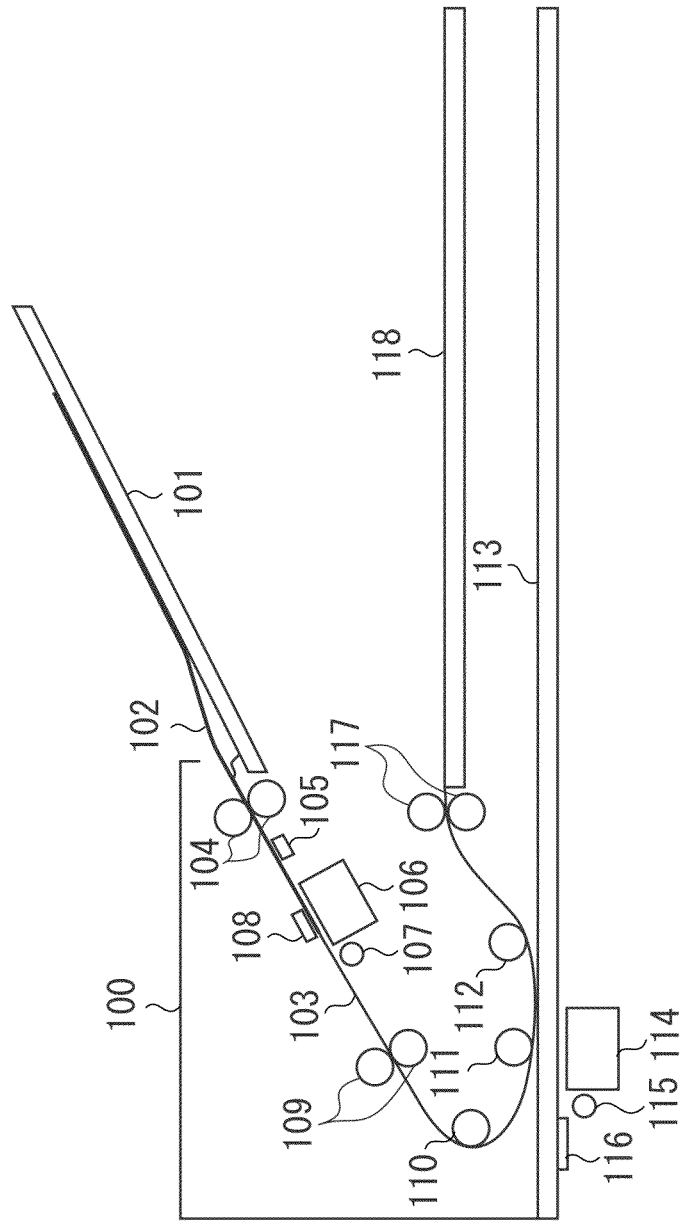

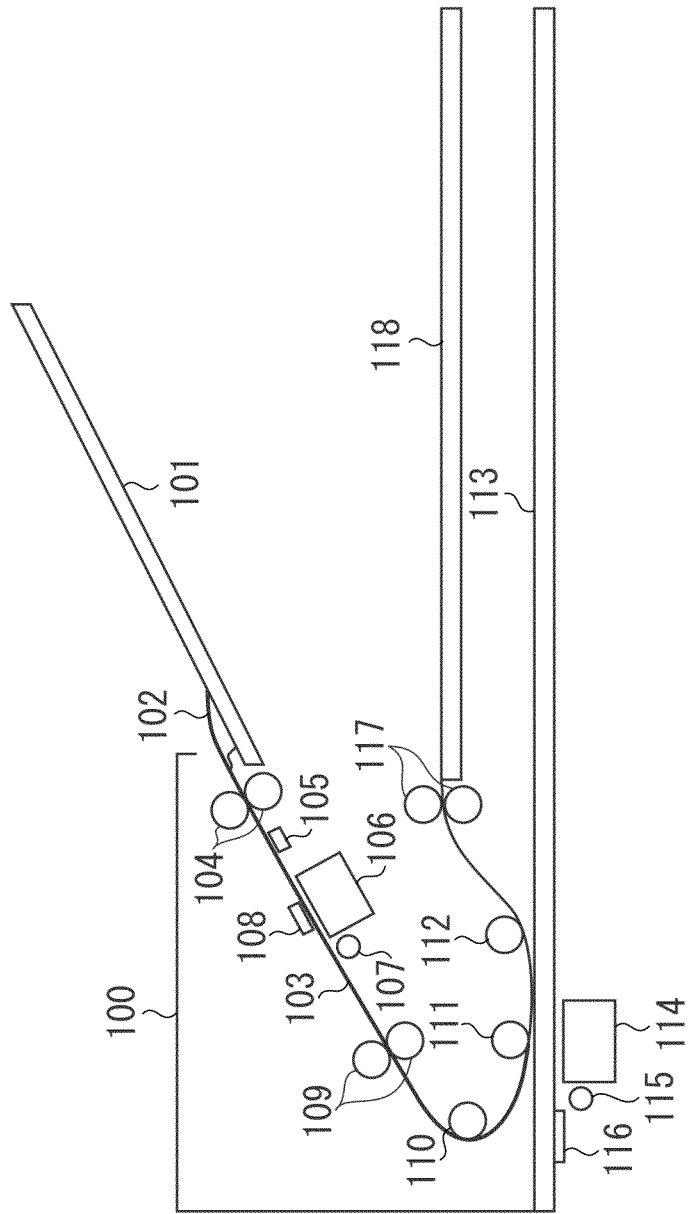

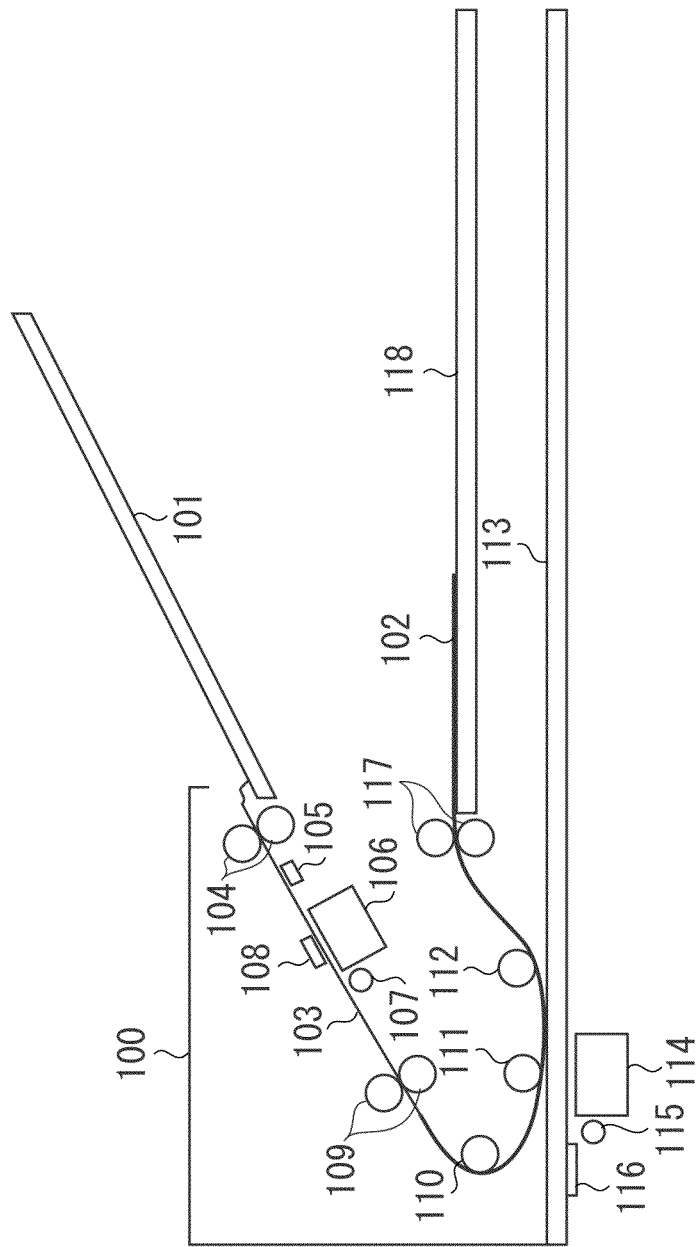

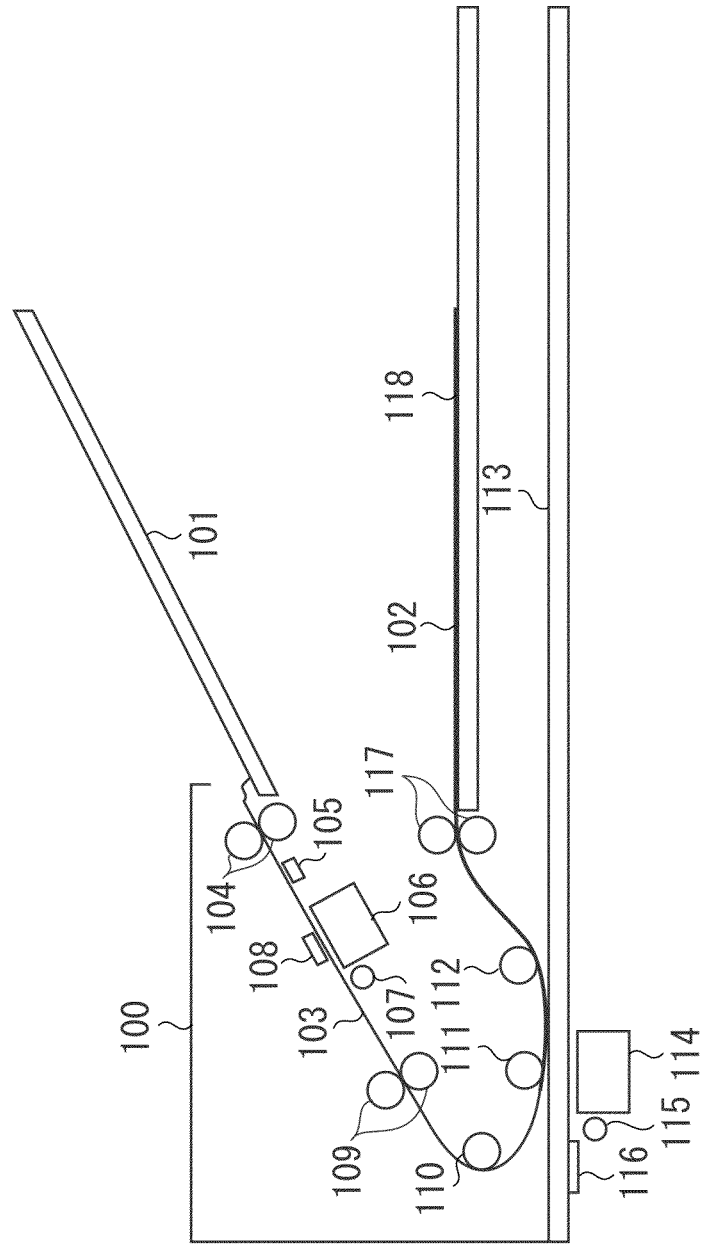

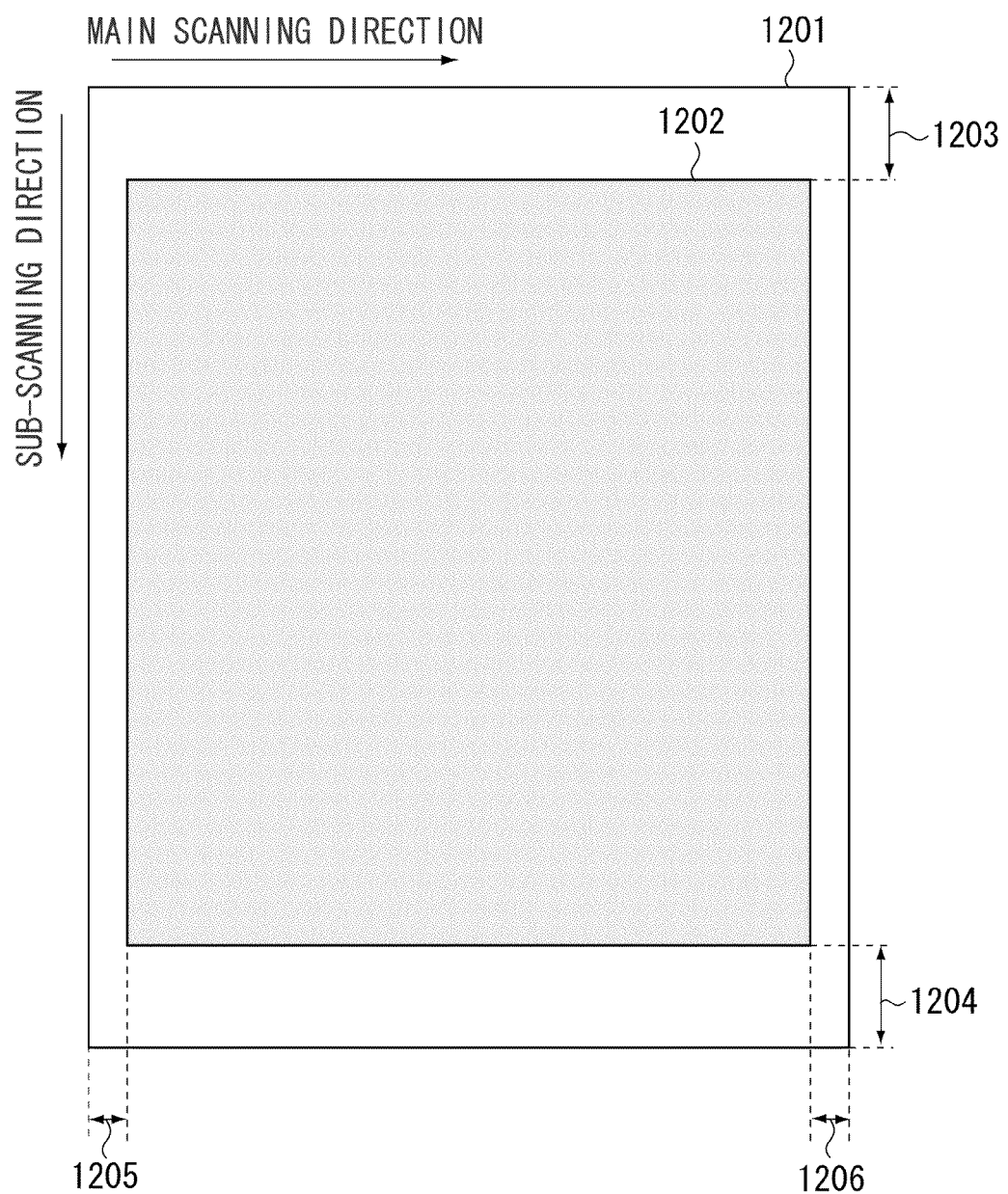

IMAGE READING APPARATUS AND IMAGE CONTROL METHOD OF IMAGE READING APPARATUS, AND STORAGE MEDIUM

BACKGROUND OF THE INVENTION

1. Field of the Invention

The present invention relates to an image reading apparatus, a control method of an image reading apparatus, and a storage medium.

2. Description of the Related Art

Conventionally, there is an image reading apparatus that determines whether image data in a read document is color image data or monochrome image data. By performing such determination, the image reading apparatus can use, when performing image processing, parameters according to the type of image data. High image quality can thus be realized in the image to be processed.

Further, a conventional image reading apparatus conveys the document mounted on a document mounting unit and reads the image in the conveyed document. Among such image reading apparatuses, there is an image reading apparatus that reads the images on two sides of the document (i.e., a front side and a back side) in one conveyance process. It thus becomes unnecessary in such an image reading apparatus to read the document in two separate conveyance processes, i.e., the process for conveying the front side of the document and the process for conveying the back side of the document. As a result, time required for conveying the document can be reduced.

For example, Japanese Patent Application Laid-Open No. 2001-320557 discusses a configuration in which reading sensors for reading a two-sided document are disposed at a position facing the front side and a position facing the back side respectively. Both sides of the document can thus be read in one conveyance process.

However, the image reading apparatus which reads the document while conveying the document reads, when reading the front side of the document, an image on the front side of the document after causing the document to pass through a curved document conveyance path. The image reading apparatus may thus be unable to correctly determine the document due to vibration generated when conveying the document.

Such a problem will be described in detail below with reference to an image reading apparatus illustrated in FIGS. 11A and 11B. Referring to FIGS. 11A and 11B, the image reading apparatus conveys a document 102, using conveyance rollers 109, 110, 111, and 112, and reads the document 102 using a reading unit 114.

FIG. 11A illustrates a state in which a leading end portion of the document 102 that is conveyed by being greatly bent, has reached a reading position of the reading unit 114. In such a state, the conveyance roller 112 is not involved in the conveyance process, so that conveyance control of the document 102 is performed by only the conveyance rollers 109, 110, and 111.

Further, FIG. 11B also illustrates a state where a trailing end portion of the document 102 is to be read by the document 102 being greatly bent. Since the conveyance roller 109 becomes uninvolved in performing conveyance control in such a state, the conveyance process is performed by only the conveyance rollers 110, 111, and 112.

When the image reading apparatus reads the leading end and the trailing end portions of the document 102 as described above, shift and distortion that are difficult to estimate are generated in performing conveyance control. This is different from when the image reading apparatus conveys other regions of the document 102.

As a result, the read image data acquired in the above-described states may not become correctly read values for each pixel.

In particular, when a charge-coupled device (CCD) is employed as a reading device, a reading line position for each color component is different. The reading value of each component for the pixel may thus not be correctly acquired even when values between the lines of the sensor corresponding to the color components are corrected.

As described above, when one reading sensor reads one side of the document, color information of a predetermined region included in a front side of the document may not be correctly read. This is due to the positions in which the reading sensors are disposed and the curved shape of the document conveyance path. The predetermined region is, for example, the leading end and the trailing end portions of the document with respect to a conveying direction thereof.

To solve such a problem, the predetermined region positioned at the leading end portion of the document to be read by the front side reading unit may not be set as a region for determining the color. In such a case, if a color pixel is included in the predetermined region, the document may not be correctly determined as a color document. For example, such a case may occur when the region other than the predetermined region in the document is a monochrome image.

SUMMARY OF THE INVENTION

According to an aspect of the present invention, an image reading apparatus includes a first reading unit, a second reading unit, and a determination unit. The first reading unit reads an image on a first side of a document conveyed through a document conveyance path. The second reading unit is disposed in the document conveyance path at a reading position that is different from a reading position of the first reading unit and reads an image on a second side that is different from the first side on the document. The determination unit determines whether the document is a color document, according to whether a color image is included in an image in a predetermined region of the first side read by the first reading unit, and in an image in a region that is different from the predetermined region in the first side and read by the second reading unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 1A and 1B illustrate configurations of an image reading apparatus according to an exemplary embodiment.

FIG. 2 is a block diagram illustrating a configuration of a processing circuit that performs color determination of a document according to an exemplary embodiment.

FIG. 4 is a flowchart illustrating a reading process performed by a contact image sensor (CIS) reading unit 106 (first reading sensor) according to an exemplary embodiment.

FIG. 5 is a flowchart illustrating a reading process performed by a CCD reading unit 114 (second reading unit) according to an exemplary embodiment.

FIGS. 10A and 10B illustrate states of document conveyance according to an exemplary embodiment.

FIGS. 11A and 11B illustrate states of document conveyance according to an exemplary embodiment.

FIGS. 12A and 12B illustrate states of document conveyance according to an exemplary embodiment.

FIG. 13 illustrates a region in a document on which color determination is performed when reading two sides of the document according to an exemplary embodiment.

DESCRIPTION OF THE EMBODIMENTS

Figure 3:
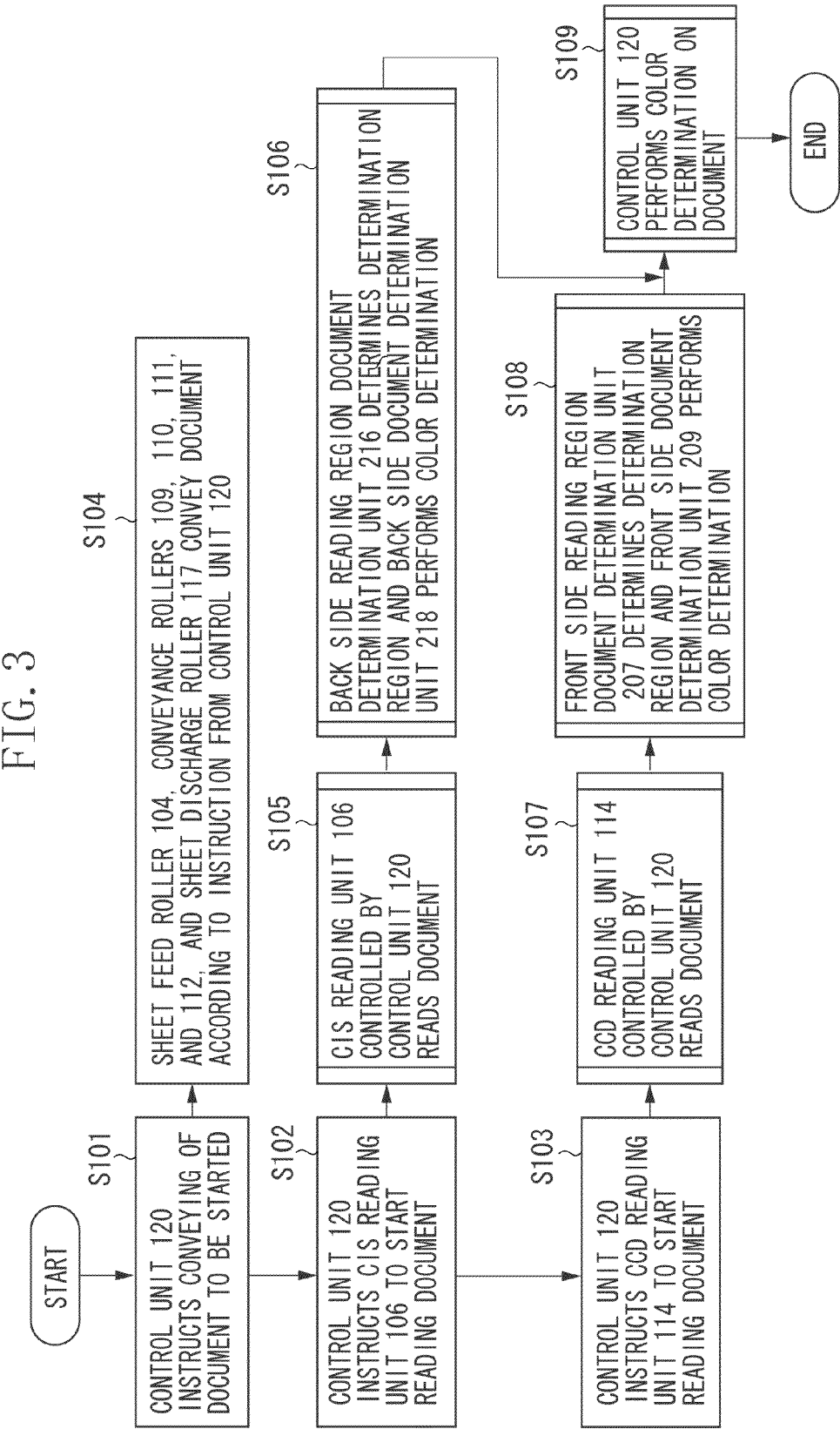
FIG. 3 illustrates a process for reading a document according to an exemplary embodiment.

Various exemplary embodiments, features, and aspects of the invention will be described in detail below with reference to the drawings.

FIGS. 1A and 1B illustrate example configurations of an image reading apparatus according to a first exemplary embodiment. Referring to FIGS. 1A and 1B, the image reading apparatus includes a two-sided reading function for reading a front side and a back side of a document in one conveyance process. Further, the image reading apparatus according to the present exemplary embodiment performs document color determination, i.e., determines whether the image in the front side or the back side of the document is a color image or a monochrome image.

The image reading apparatus includes two reading sensors for reading the document to be read, and each sensor is disposed at a position facing the front side or the back side of the document respectively. Further, the image reading apparatus includes two reading modes, i.e., a one-sided reading mode and a two-sided reading mode.

In the two-sided reading mode, the image reading apparatus reads the two-sided document by reading the back side of the document using one sensor (i.e., a CIS reading unit 106), and the front side of the document using the other sensor (i.e., a CCD reading unit 114). In other words, each sensor functions as a reading unit for reading the information in the document. Further, the image reading apparatus determines whether the document is a color document in which each of the front side and the back side of the document includes color, or a monochrome document in which each of the sides does not include color.

On the other hand, in the one-sided reading mode, the image reading apparatus reads using a sensor (i.e., a CIS reading unit 106) to read from the back of the document, an offset image in the leading end and the trailing end portions of the front side of the document. Further, the other sensor (i.e., a CCD reading unit 114) reads the front side of the document from the front of the document. The image data in the leading end and the trailing end portions of the document which is acquired by the CIS reading unit 106, is used for color determination, i.e., whether the image data includes color.

The image data acquired by the CCD reading unit 114 is employed in digitization of the document and in determining whether there is color data in the portions other than the leading end and the trailing end portions of the document.

The image reading apparatus thus determines whether the document is a color document based on the two color determination results.

The image read by the image reading apparatus is stored in a hard disk drive (HDD, not illustrated) therein, and is displayed on a display unit (not illustrated) or transmitted to an external device via a network. If the image reading apparatus is connected to a printing apparatus such as a printer, the image read by the image reading apparatus may be transmitted to and printed by the printing apparatus.

The above-described color document is a document that includes color of a predetermined value or more, and the color document does not necessarily mean that a document including even a color pixel is determined to be a color document.

The configuration of the image reading apparatus will be described below. The problem arising when a process is not performed in the one-sided reading mode according to the first exemplary embodiment, and details of the operations to be performed will also be described below.

(Configuration of the Image Reading Apparatus)

FIG. 1A illustrates a mechanical configuration of the image reading apparatus according to the first exemplary embodiment.

Referring to FIG. 1A, an auto document feeder (ADF) 100, i.e., a reading apparatus, conveys each page of the mounted document 102 along the conveyance path and reads the content of the document.

Each of the components in the reading apparatus 100 is electrically connected to a control unit 120 to be described below. The control unit 120 controls the operations of the reading apparatus 100.

The reading apparatus 100 includes a document mounting unit 101 on which the document 102 is mounted. The user places the document 102 on the document mounting unit 101, and the reading apparatus 100 conveys the document 102 through the reading apparatus 100 and acquires image information of the document 102.

The document 102 is generally mounted on the document mounting unit 101 so that the front side is facing upwards in FIG. 1A. The reading apparatus 100 acquires the contents such as diagrams and character strings written on the document 102 as the image data, and performs color determination on the acquired image data of the document.

The document 102 is moved along a conveyance path (i.e., a document conveyance path) 103 in the reading apparatus 100. The conveyance path 103 is usually curved due to downsizing or the mechanical configuration of the reading apparatus. The document 102 is thus moved along the curved conveyance path 103.

A document feed roller 104 picks up and places on the conveyance path 103, each page of the document 102 mounted on the document mounting unit 101. An end portion detection sensor 105 detects the leading end and the trailing end portions of the document image data. When the document 102 is conveyed on the conveyance path 103, the end portion detection sensor 105 detects the time point at which the leading end portion of the document 102 with respect to a document conveying direction reaches the position of the end portion detection sensor 105. The end portion detection sensor 105 also detects the time point at which the trailing end portion of the document 102 passes through the position of the end portion detection sensor 105.

The end portion detection sensor 105 then notifies a control device (hereinafter referred to as a control unit) that controls the entire reading apparatus, by transmitting a detection signal i.e., a level signal or an interrupt signal. The electrical connection of the control unit 120 in the reading apparatus 100 will be described below with reference to FIG. 1B.

The CIS reading unit 106 reads the light received from the back side of the document 102 and acquires information thereof. The CIS reading unit 106 is configured of a contact image sensor.

The CIS reading unit 106 is disposed within the ADF 100 at a position for reading the light reflected from the back side of the document. Further, the CIS reading unit 106 is disposed so that the document reading position is different from that of the CCD reading unit 114 to be described below at an arbitrary time.

Furthermore, the CIS reading unit 106 is a line sensor that reads a line of the conveyed document 102 in a width direction. If the image reading apparatus 100 is capable of reading an A4 size document, the width of the CIS reading unit 106 is set so that the CIS reading unit 106 is capable of reading the A4 size document.

A light source 107 supplies the light necessary for the CIS reading unit 106 to read the document. The light source 107 is disposed on the back side of the document, similarly as the CIS reading unit 106. The light source 107 is a light emitting diode (LED) that allows the reading operation to be performed by the CIS reading unit 106.

When the CIS reading unit 106 is to read the document, the light source 107 emits light to the document. The CIS reading unit 106 then reads the light reflected from the back side of the document 102. A white plate 108 which is used to acquire a reference level of the CIS reading unit 106 is attached as a strictly supervised reference of the reading value of the reading apparatus.

In a case where the CIS reading unit 106 is to read the color information of the document, the CIS reading unit 106 changes illuminant colors of the LED to red, blue, and green. Further, the CIS reading unit 106 can increase a quantity of light emitted from the light source 107 and read the light that is transmitted through the document. More specifically, the light source 107 emits the light that is transmitted through the document 102, then reflected from the white plate 108, then transmitted through the document 102, and read by the CIS reading unit 106.

The conveyance rollers 109, 110, 111, and 112 convey the document 102 along the conveyance path 103. The control unit 120 performs control so that each of the conveyance rollers 109, 110, 111, and 112 is moved in synchronization with each other. The document 102 is thus sequentially conveyed to each of the reading positions of the CIS reading unit 106 and the CCD reading unit 114.

In other words, the conveyance rollers 109, 110, 111, and 112 cause the document 102, the CIS reading unit 106, and the CCD reading unit 114 to relatively move in a moving path along the conveying path 103. As a result, the CIS reading unit 106 or the CCD reading unit 114 can read a side of the document 102 that passes through each of the reading positions.

A glass plate 113 is a stage on which the user mounts the document 102 when ADF is not used to read the document.

When the user mounts the document 102 on the document mounting unit 101 so that the front side faces upwards, the CCD reading unit 114 reads the front side of the document 102 that is conveyed and has reached the reading position. The CCD reading unit 114 then acquires the read side of the document 102 as information. The CCD reading unit 114 is disposed below the glass plate 113 at a position for reading the light reflected from the front side of the document 102, i.e., the light received from the front side of the document 102.

The CCD reading unit 114 is a sensor including three lines corresponding to red, blue, and green colors respectively. A light source 115 emits white light to the document, and each line sensor reads each color component. As a result, the CCD reading unit 114 acquires the color information of the document.

A white plate 116 is used to acquire a reference level of the CCD reading unit 114 as a strictly supervised reference of the reading value of the reading apparatus. A sheet discharge roller 117 outputs the read document 102 to a sheet discharge tray 118.

An electrical configuration of the reading apparatus 100 will be described below with reference to FIG. 1B. Each component in the reading apparatus 100 is electrically connected to the control unit 120. The control unit 120 is capable of receiving notification from and issuing an instruction to each component. The control unit 120 thus mainly instructs each component in the reading apparatus 100 to perform operations.

Each component in the reading apparatus 100 starts to operate by receiving an operation start instruction from the control unit 120, and performs an operation based on the parameters transmitted to each component from the control unit 120. Each component stops operating by receiving an operation stop instruction from the control unit 120. Further, the control unit 120 is connected to a processing circuit 121 that performs color determination, and controls the light sources. The light sources 107 and 115 are also connected to the processing circuit 121.

A memory (not illustrated) in the control unit 120 stores programs for controlling the control unit 120 and the processing circuit 121, that are necessary for executing the processes illustrated in FIGS. 3, 4, 5, 6, 7, and 8 to be described below. The control unit 120 and the processing circuit 121 thus operate, and the processes illustrated in FIGS. 3, 4, 5, 6, 7, and 8 are performed, by the programs being developed and executed by a central processing unit (CPU) in the control unit 120.

The processing circuit 121 determines whether the document is a color document or a monochrome document, based on the document image data of the document 102 read by the CIS reading unit 106 and the CCD reading unit 114.

Further, when the reading apparatus 100 reads the document, the processing circuit 121 controls turning on and off and the quantities of light emitted from the light sources 107 and 115, according to the instruction from the control unit 120. Furthermore, the processing circuit 121 stores in the HDD (not illustrated) or transmits to an image forming processing unit (not illustrated) for printing, the document image data that the CIS reading unit 106 and the CCD reading unit 114 read from the document 102, as electronic document.

The control unit 120 performs such storing and printing according to the instructions received from the user using an operation unit 122 to be described below. The image data once stored in the HDD may be read out from the HDD and printed according to the user instruction received via the operation unit 122.

The operation unit 122 can be used by the user to input an instruction to start reading, and whether the document is a one-sided document or the two-sided document. For example, the operation unit 122 includes a touch panel, and the user selects a button or an icon displayed on a screen to input the selected information to the control unit 120. The user thus sets the read start instruction and whether the document is the one-sided document or the two-sided document. The setting of whether the document is the one-sided document or the two-sided document is then stored in a memory (not illustrated).

A configuration of a determination unit that performs color determination of the document image data using the above-described control unit 120 and the processing circuit 121 according to an exemplary embodiment will be described below with reference to FIG. 2.

According to the first exemplary embodiment, when the reading apparatus 100 is to read a one-sided document, the control unit 120 divides one side of the document 102 into a plurality of regions. The control unit 120 then selectively applies the CIS reading unit 106 and the CCD reading unit 114 to at least one of the plurality of divided regions, and performs color determination.

Further, when the reading apparatus 100 is to read a two-sided document, the control unit 120 reads the back side of the document using the CIS reading unit 106 and the front side using the CCD reading unit 114. The control unit 120 then performs color determination based on the each of the read information.

The components in the circuit connected by arrows illustrated in FIG. 2 are connected, and electric signals including predetermined information are transmitted in a direction indicated by the arrow. Further, each component in the processing circuit 121 is capable of receiving the signal from the control unit 120.

A front side light source lighting control unit 201 performs lighting control of the light source 115 that becomes necessary in reading the front side of the document. The front side light source lighting control unit 201 outputs a light source lighting control signal 202.

Image data 203 is the image data read by the CCD reading unit 114. A front side image data input interface (I/F) unit 204 controls the image data 203. A front side image processing unit 205 performs shading correction using the reading value of the white plate 116 as reference, and converts the read image data in a device-dependent color space to image data in a normalized color space (e.g., sRGB space).

A front side image data output interface (I/F) unit 206 sequentially outputs the image data processed by the front side image processing unit 205. The output document image data is stored in a memory in the reading apparatus.

When the document is to be copied, the image data is read out from the storing unit. Image processing is then performed on the image data according to an output device (i.e., a recording device, e.g., a laser beam printer and an inkjet printer) that configures a multifunction peripheral, and the processed image data is output on a printing medium. In a case where the document is to be converted to an electronic document, character recognition such as optical character recognition (OCR) and image processing is performed on the image data to create data of an electronic file object.

A front side reading region document determination unit 207 is used for performing color determination of a front side reading region. More specifically, the front side reading region document determination unit 207 refers to a position of the image data output from the front side image data input I/F unit 204, and determines whether the position corresponds to an image data region to be used in color determination. The front side reading region document determination unit 207 then outputs the image data to be used in color determination as image data 208.

A front side document determination unit 209 acquires color difference information (i.e., chromatic information) for all pixels in the input image data, based on the acquired image data 208. The front side document determination unit 209 then accumulates the color difference information, and determines whether the image data 208 is color image data or monochrome image data, based on whether the accumulation result reaches a predetermined value set by the control unit 120.

In the case of the one-sided reading mode, the front side document determination unit 209 stores in a memory therein, two color determination results. One color determination result is based on the image data 208, i.e., the information acquired by the CIS reading unit 106 reading a predetermined region in one side of the document 102. The other color determination result is based on image data 217, i.e., information acquired by the CCD reading unit 114 reading a predetermined region in one side of the document 102.

More specifically, in the one-sided reading mode, one side (i.e., front side) of the document is read by two sensors, i.e., the CIS reading unit 106 and the CCD reading unit 114, so that the two color determination results are stored. In contrast, in the two-sided reading mode, the color determination result based on the image data 217, i.e., the information acquired by the CCD reading unit 114 reading a predetermined region in one side of the document 102, is stored in the memory (not illustrated). The control unit 120 then refers to the stored determination result, and determines whether the document 102 is a color document.

A back side light source lighting control unit 210 performs lighting control of the light source 107 that becomes necessary when reading the back side of the document. The back side light source lighting control unit 210 outputs a light source lighting control signal 211.

Image data 212 is the image data read by the CIS reading unit 106, and a back side image data input I/F unit 213 controls the image data 212. A back side image processing unit 214 performs shading correction using the reading value of the white plate 108 as reference, and converts the read image data in the device-dependent color space to the image data in the normalized color space. A back side image data output I/F unit 215 sequentially outputs the image data processed by the back side image processing unit 214.

A back side reading region document determination unit 216 is used for performing color determination of a back side reading region. More specifically, the back side reading region document determination unit 216 refers to a position of the image data output from the back side input image data I/F unit 213, and determines whether the position corresponds to the image data region to be used in color determination. The back side reading region document determination unit 216 then outputs the image data to be used in color determination as the image data 217. In the case of the one-sided reading mode, the image data 217 becomes the image data region read by the CIS reading unit 106 for determining the leading end portion and the trailing end portion of the front side of the document 102. In the case of the two-sided reading mode, the image data 217 becomes the image data region read by the CIS reading unit 106 for determining the back side of the document 102.

A back side document determination unit 218 refers to the image data 217, and acquires color difference information (i.e., chromatic information) for all pixels of the input image data. The back side document determination unit 218 then accumulates the color difference information, and determines whether the image data 217 is color image data or monochrome image data based on whether the accumulation result reaches a predetermined value set by the control unit 120.

The back side document determination unit 218 outputs a determination signal 219 that indicates whether the image data is color image data or monochrome image data. In the one-sided reading mode, the back side document determination unit 218 outputs the determination signal 219 to the front side document determination unit 209. In the two-sided reading mode, the back side document determination unit 218 stores the determination result in a memory therein.

The processes for reading the document and performing color determination according to an exemplary embodiment realized by the above-described configuration will be described below. The process will be described below with reference to FIGS. 3, 4, 5, 6, 7, and 8 that illustrate control flows, and FIGS. 10A, 10B, 11A, 11B, 12A, and 12B that illustrate states of the document 102 being conveyed.

(Document Reading Operation)

A reading process performed by the reading apparatus 100 will be described below with reference to FIG. 3. Each step in the flowchart illustrated in FIG. 3 is realized by the CPU (not illustrated) included in the control unit 120 executing a program read out from a memory (e.g., a read-only memory (ROM)) in the control unit 120.

Referring to FIG. 3, the components in the reading apparatus 100 starts conveying the document according to an instruction from the control unit 120. The CIS reading unit 106 and the CCD reading unit 114 read the document as the document is conveyed, and color determination is performed based on the read content. Each step will be described in detail below.

The user mounts the document 102 on the reading apparatus 100 and uses the operation unit 122 to instruct the reading apparatus 100 to start the reading operation. The control unit 120 in the apparatus according to the present exemplary embodiment then starts performing reading control. In step S101, the control unit 120 instructs conveying of the document to be started.

In step S104, the sheet feed roller 104 and the conveyance rollers 109, 110, 111, and 112 are driven by the control unit 120 to convey the document along the conveyance path 103. At the same time, the control unit 120 recognizes using the end portion detection sensor 105 that the document 102 has reached the reading start position of the CIS reading unit 106.

In step S102, upon recognizing that the document 102 has reached the reading start position of the CIS reading unit 106, the control unit 120 instructs the CIS reading unit 106 to start reading the document 102. In step S105, the CIS reading unit 106 then reads a predetermined region of the document. Such a process will be described below with reference to FIG. 4.

The control unit 102 then recognizes using the end portion detection sensor 105 that the document 102 has reached the reading start position of the CCD reading unit 114. In step S103, when the document 102 has reached the reading start position of the CCD reading unit 114, the control unit 120 instructs the CCD reading unit 114 to start reading the document 102. In step S107, the CCD reading unit 114 reads a predetermined region of the document. Such a process will be described below with reference to FIG. 5.

In step S106, the back side reading region determination unit 216 decides on, based on the information read by the CIS reading unit 106 in step S105, a determination region for performing color determination of the document. The back side document determination unit 218 then determines whether the color determination region is a color region or a monochrome region. Such a process will be described below with reference to FIG. 6.

In step S108, the front side reading region determination unit 207 decides on, based on the information read by the CCD reading unit 114 in step S107, a determination region for performing color determination of the document. The front side document determination unit 209 then determines whether the color determination region is a color region or a monochrome region. Such a process will be described below with reference to FIG. 7.

The control unit 120 then determines, based on the determination results acquired in step S106 and step S108, whether the document 102 is a color document or a monochrome document. Such a process will be described below with reference to FIG. 8.

The document reading operation performed by the CIS reading unit 106 in step S105 illustrated in FIG. 3 will be described in detail below with reference to FIG. 4. FIG. 4 is a flowchart illustrating a process performed by the CIS reading unit 106 and the light source 107, controlled by the control unit 120. Each step in the flowchart illustrated in FIG. 4 is realized by the CPU (not illustrated) included in the control unit 120 executing a program read out from a memory (e.g., a ROM) in the control unit 120.

In step S201, the user designates, using the operation unit 122, the reading operation mode. If the user designates the one-sided reading mode (i.e., front side reading mode) as the reading operation mode (YES in step S201), the control unit 120 then starts performing one-sided reading control. The process proceeds to step S209.

In step S209, the control unit 120 instructs the sheet feed roller 104 to pick up the document 102 mounted on the document mounting unit 101, and place the document 102 on the conveyance path 103. Upon receiving the instruction, the sheet feed roller 104 picks up the document 102, and places the document 102 on the conveyance path 103. The sheet feed roller 104 then conveys the document 102 to the reading start position in which the CIS reading unit 106 can read the document.

Figure 10A:
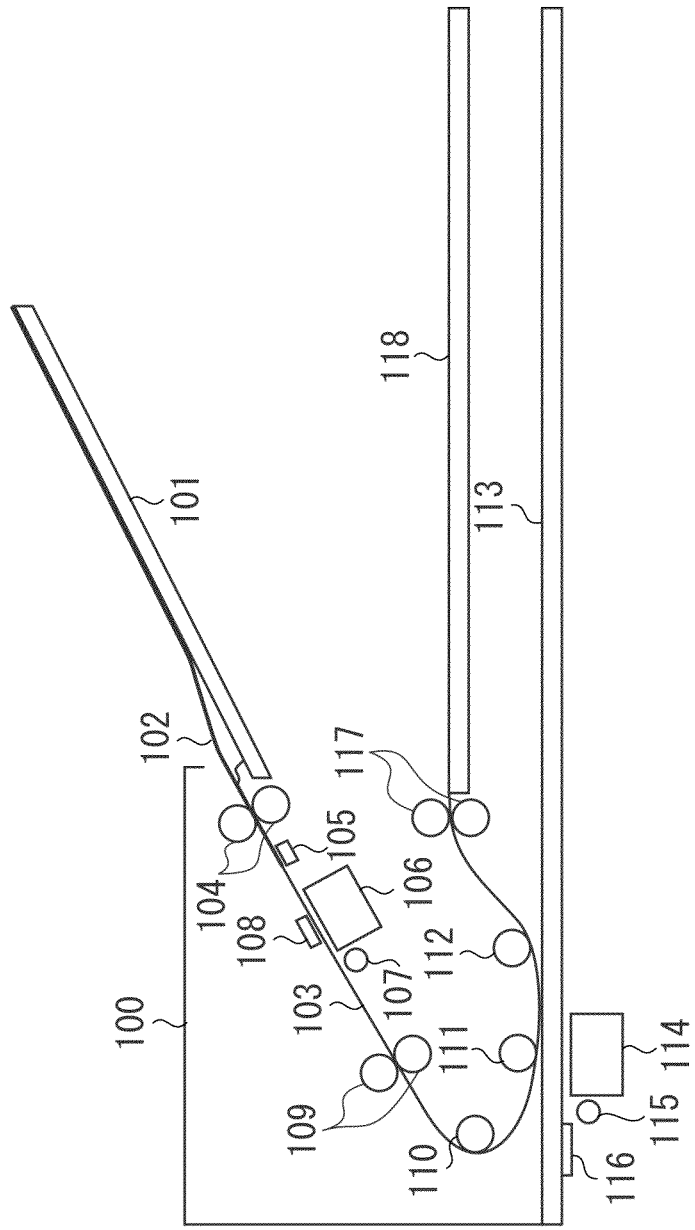
Figure 11B:
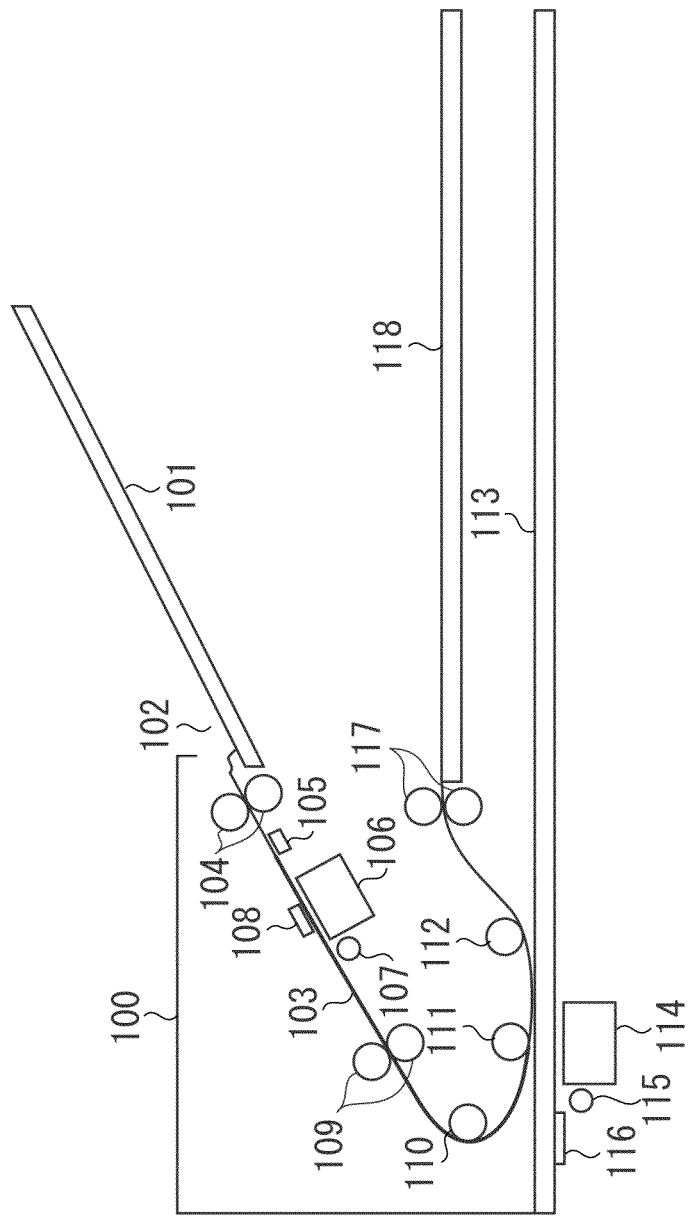

FIG. 10A illustrates a state in which the document 102 mounted on the document mounting unit 101 is picked up and placed on the conveyance path 103 by the sheet feed roller 104.

The sheet feed roller 104 thus sequentially conveys the document 102 in the conveying direction. In step S210, it is determined whether the leading end portion of the document 102 conveyed by the sheet feed roller 104 has reached the end portion detection sensor 105. If the leading end portion of the document 102 has reached the end portion detection sensor 105 (YES in step S210), the end portion detection sensor 105 outputs a signal to the control unit 120 indicating that the document 102 has reached such a position. FIG. 10A illustrates the above-described state.

A conveyance level (i.e., a conveyance speed) of the document 102 by the drive control performed on the sheet feed roller 104 is defined by a number of steps a motor is driven by the control unit 120. More specifically, after the document 102 reaches the end portion detection sensor 105, the control unit 120 can determine an amount by which the motor is to be driven so that the leading end portion of the document 102 reaches the reading position of the CIS reading unit 106.

If the leading end portion of the document 102 reaches the end portion detection sensor 105 by the drive of the sheet feed roller 104 (YES in step S210), the process proceeds to step S211. In step S211, the control unit 120 instructs the back side light source lighting control unit 210 to start performing lighting control. As a result, when the leading end portion of the document 102 reaches the end portion detection sensor 105 by the motor being driven by a predetermined number of steps, the lighting source 107 for lighting the back side of the document is turned on.

The quantity of light emitted from the light source 107 which is turned on in step S211 is controlled to become greater than the quantity of light for reading the back side of the document 102 when both sides of the document 102 is to be read. The light quantity is controlled as described above so that the CIS reading unit 106 reading the leading end portion of the front side of the document 102 can correctly acquire the document image data using the transmitted light.

The light quantity also depends on paper type of the document image data. A maximum light quantity is thus determined as a value according to the paper type instructed by the user using the operation unit 122.

As described above, a reading unit that is used for reading the back side of the document by receiving the reflected light from the back side and reading the content of the back side, is used for reading the content of the front side. The reading unit reads the content of the front side by reading the light transmitted from the front side to the back side of the document. Color determination can thus be performed by effectively using the reading unit.

FIG. 10B illustrates a state where the document 102 reaches the back side reading position by drive of the sheet feed roller 104. The control unit 120 then starts performing reading control of the back side image data.

In step S212, the light source 107 emits light to the back side of the document 102, and the CIS reading unit 106 reads the image data. In step S213, the document is conveyed, and the CIS reading unit 106 continues to read the leading end portion of the document 102 in synchronization with conveyance control.

A range of the leading end portion of the document read by the CIS reading unit 106 corresponds to the region read by the CCD reading unit 114 that reads the front side of the document, in which the image data is unstable due to conveyance control. In other words, referring to the configuration illustrated in FIG. 1 as an example, such a range is a region in which the leading end portion of the document 102 cannot be regularly conveyed by the conveyance rollers 109, 110, 111, and 112. It becomes a region defined on the conveyance path 103 from the conveyance roller 112 to the conveyance roller 109.

Further, the leading end portion of the document 102 described above is an end portion with respect to a sub-scanning direction perpendicular to a line to be read by the line sensor in the CIS reading unit 106. The leading end is the portion that is first conveyed with respect to the conveying direction of the document.

The control unit 120 can determine the conveyance speed of the document 102 by drive control of the plurality of conveyance rollers. The control unit 120 thus instructs conveyance control to be performed until the CIS reading unit 106 completes reading of the leading end portion of the document 102. In step S214, the control unit 120 determines whether the reading end position of the leading end portion of the document 102 has been reached. If such a position has been reached (YES in step S214), the process proceeds to step S215. In step S215, the control unit 120 instructs the light source 107 to be turned off.

By the above-described control, the CIS reading unit 106 can read the leading end portion of the front side of the document 102.

The control unit 120 continues to sequentially perform conveyance control of the document 102. When the leading end portion of the document 102 reaches the conveyance rollers 109, 110, and 111 (i.e., when the control unit 102 has performed step control until the leading end portion of the document 102 reaches the conveyance rollers), the control unit 120 controls the document 102 to be conveyed using each of the related conveyance rollers.

In step S216, after controlling the light source 107 to be turned off, the control unit 120 uses the plurality of conveyance rollers to perform conveyance control of the document 102. In step S217, the control unit 120 determines whether the trailing end portion of the document 102 has reached the read start position of the CIS reading unit 106. If the trailing end portion has reached the read start position of the CIS reading unit 106 (YES in step S217), the process proceeds to step S218. In step S218, the control unit 120 again instructs the light source 107 to be turned on. The determination on whether the trailing end portion of the document 102 has reached the read start position in step S217 is based on whether a predetermined step drive has been performed after the end portion detecting sensor 105 has detected the leading end portion.

The quantity of light emitted when the light source 107 is turned on at the trailing end portion reaching the read start position is greater than the quantity of light emitted when both sides of the document 102 are to be read. It is desirable that the light quantity is the same value as the light quantity when reading the leading end portion of the document 102.

In step S219, the light source 107 emits light to the document 102, and the CIS reading unit 106 reads the image data. In step S220, the CIS reading unit 106 continues to read the predetermined trailing end portion of the document 102 in synchronization with conveyance control.

A range of the trailing end portion of the document to be read by the CIS reading unit 106 corresponds to the region in which the image data, read by the CCD reading unit 114 that reads the front side of the document, is unstable due to conveyance control.

In other words, referring to the configuration illustrated in FIG. 1 as an example, such a range is a region in which the trailing end portion of the document 102 cannot be regularly conveyed by the conveyance rollers 109, 110, 111, and 112. It becomes a region defined according to the distance from the conveyance roller 112 to the conveyance roller 109.

Further, the trailing end portion of the document 102 described above is an end portion with respect to a sub-scanning direction perpendicular to a line to be read by the line sensor in the CIS reading unit 106. The trailing end portion is later conveyed with respect to the conveying direction of the document.

The control unit 120 can determine the conveyance speed of the document 102 by performing drive control of the plurality of conveyance rollers. The control unit 120 instructs conveyance control to be performed until the CIS reading unit 106 completes reading of the trailing end portion of the document 102. In step S221, the control unit 120 determines whether the reading end position of the trailing end portion has been reached. If such a position has been reached (YES in step S221), the process proceeds to step S222. In step S222, the control unit 120 ends reading, and instructs the light source 107 to be turned off.

On the other hand, if the user designates using the operation unit 122 the two-sided reading mode as the reading operation mode (NO in step S201), the control unit 120 starts controlling two-sided reading. More specifically, the control unit 120 instructs the sheet feed roller 104 to convey the document 102 to the reading position of the CIS reading unit 106. In step S202, upon receiving the instruction, the sheet feed roller 104 conveys the document 102.

In step S203, the control unit 120 determines whether the document 102 has reached the reading position of the CIS reading unit 106. If the document 102 has reached such a position (YES in step S203), the control unit 120 performs capturing control of the image data in the document 102. More specifically, in step S204, the control unit 120 instructs the back side light source lighting control unit 210 that performs lighting control of the light source 107 used in the first reading unit to turn on the light source 107.

In step S205, after the light source 107 is turned on, the light reflected from the document 102 is input to the CIS reading unit 106. A sensor device in the CIS reading unit 106 then converts the received light to an electric signal and outputs the signal.

In step S205, step S206, and step S207, the control unit 120 outputs instructions to each of the components, so that document reading control is continuously performed. When the trailing end portion of the document 102 passes through the end portion detection sensor 105 (refer to FIG. 11B), the end portion detection sensor 105 outputs to the control unit 120 a signal indicating that the trailing end portion of the document 102 has passed through.

Upon receiving the output signal from the end portion detection sensor 105, the control unit 120 performs reading control of the back side of the document 102, limited to a number of lines from the position of the end portion detection sensor 105 to the back side reading position. Such a process is performed so that the CIS reading unit 106 reads the region to the trailing end portion of the document. The process is performed by the control unit 120 that stores the number of lines remaining for reading the back side image data and the number of lines remaining for reading the front side image data of the document 102.

In step S207, the control unit 120 determines whether the document 102 has reached the reading end position of the CIS reading unit 106. If the CIS reading unit 106 has completed reading the back side image data of the document 102 (YES in step S207), the control unit 120 performs control to turn off the light source 107 for reading the back side image data. The control unit 120 performs such control after a predetermined time has elapsed, or after performing predetermined conveyance control. More specifically, in step S208, the control unit 120 instructs the back side light source lighting control unit 210 to turn off the light source 107.

The document reading operation performed by the CCD reading unit 114 in step S107 illustrated in FIG. 3 will be described in detail below with reference to FIG. 5. FIG. 5 is a control flow of the CCD reading unit 114 and the light source 115. Each step in the flowchart illustrated in FIG. 5 is realized by the CPU (not illustrated) included in the control unit 120 executing a program read out from a memory (e.g., a ROM) in the control unit 120.

In step S301, after the document reading operation is started, the document is conveyed to the reading start position of the CCD reading unit 114. The conveyance level (i.e., the conveyance speed) of the document 102 by the drive control of the sheet feed roller 104 is defined by the number of steps the motor is driven by the control unit 120.

More specifically, after the document 102 reaches the end portion detection sensor 105, the control unit 120 can determine an amount by which the motor is to be driven for the leading end portion of the document 102 to reach the reading position of the CCD reading unit 114.

In step S302, the control unit 120 determines whether the leading end portion of the document 102 has reached the lighting start position of the light source 115 for performing reading control of the front side. If the leading end portion of the document 102 has reached such a position (YES in step S302), the process proceeds to step S303. In step S303, the control unit 120 performs lighting control of the light source 115 to prepare for reading to be started.

In step S304, the control unit 120 determines whether the document 102 has reached the front side reading start position by conveyance control of the sheet feed roller 104 and the conveyance rollers 109, 110, and 111. FIG. 11A illustrates a state in which the document 102 reaches the front side reading position by drive control of the sheet feed roller 104. If the document 102 reaches such a position (YES in step S304), the process proceeds to step S305. In step S305, the control unit 120 starts performing reading control of the image data in the front side of the document 102.

In step S306, the control unit 120 performs conveyance control of the document 102 using the conveyance roller 112 disposed downstream side of the conveyance rollers 109, 110, 111, and the front side reading position. At the same time, the control unit 120 also performs reading control of the image data on the front side. FIG. 12A illustrates such a state.

In step S307, the control unit 120 determines whether the trailing end portion of the document 102 has reached the front side reading position. FIG. 12B illustrates a state in which the trailing end portion of the document 102 has reached the front side reading position. The control unit 120 determines the remaining number of lines to be read on the front side of the document, based on the time point at which the trailing end portion of the document 102 has passed through the end portion detection sensor 105. FIG. 12B thus illustrates a state in which the control unit 120 has performed control for conveying the document by such remaining number of lines.

If the control unit 120 determines that the trailing end portion of the document 102 has reached the front side reading position as illustrated in FIG. 12B (YES in step S307), the control unit 120 ends reading control of the front side of the document 102. In step S308, the control unit 120 determines whether the document 102 has reached a lighting end position, i.e., a predetermined time has elapsed from the end of reading control of the front side, or conveying control has been performed by predetermined number of steps. If the control unit 120 determines that the document 102 has reached the lighting end position (YES in step S308), the process then proceeds to step S309. In step S309, the control unit turns off the light source 115 used for reading the front side of the document 102.

(Light Quantity Control of the Light Source when Reading the Document)

Control of the quantities of light emitted from the light sources 107 and 115 that correspond to the CIS reading unit 106 and the CCD reading unit 114 respectively will be described below with reference to FIGS. 9A and 9B.

Figure 9A:
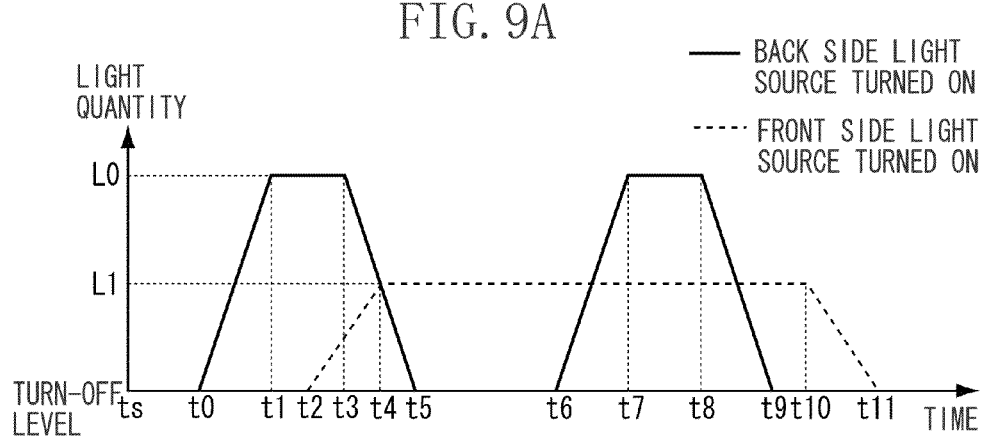
FIGS. 9A and 9B illustrate light quantity control of light sources according to an exemplary embodiment.

FIG. 9A illustrates changes in the light quantity when controlling the light source 107 in performing one-sided reading (i.e., front side reading) of the document. Referring to FIG. 9A, time at which reading control is performed is indicated on a horizontal axis, and a change in the light quantity of the light source 107 or the light source 115 is indicated on a vertical axis.

Further, referring to FIG. 9A, a change in the light quantity of the light source 107 that is used for reading the back side of the document is indicated by a solid line. A change in the light quantity of the light source 115 that is used for reading the front side of the document is indicated by a broken line.

Furthermore, t0 to t11 indicate the time points at which the state of the light source 107 or of the light source 115 changes. Moreover, L0' indicates a maximum level of the light quantity emitted from the light source 107, and L1 indicates a maximum level of the light quantity emitted from the light source 115. The maximum level of the light quantity emitted from the light source 107, i.e., L0', is set to be clearly distinguishable from L0, i.e., a maximum level of the light quantity emitted from the light source 107 when performing two-sided reading of the document.

When performing one-sided reading of the document, the light source unit reduces the quantity of light emitted to the document during the period other than when the CIS reading unit 106 is reading the leading end and the trailing end portions of the document to be read. Such light quantity control will be described below.

At timing t0, the light source 107 for reading the back side of the document 102 is turned on (i.e., t0 is the timing at which the process of step S211 illustrated in FIG. 4 is performed). The CIS reading unit 106 starts reading the image data on the back side of the document 102 at timing t1 when the quantity of light emitted from the light source 107 for reading the back side becomes stable (i.e., t1 is the timing at which the process of step S212 is performed). Further, the light source 115 for reading the front side of the document 102 is turned on at timing t2 (i.e., the process of step S303 illustrated in FIG. 5).

Control for turning off the light source 107 for reading the back side is performed at timing t3 (i.e., t3 is the timing at which step S215 is performed). The CIS reading unit 106 which reads the back side of the document 102 then ends reading the leading end portion of the document 102 (i.e., the process of step S215 is performed). The light source 107 for reading the back side becomes turned off at timing t5.

The CCD reading unit 114 for reading the front side of the document starts reading (i.e., performs the process of step S305) at timing t4 when the quantity of light emitted from the light source 115 becomes stabilized. The light source 107 is turned on again at timing t6 at which the trailing end portion of the document 102 reaches the reading start position of the CIS reading unit 106 (i.e., t6 is the timing at which the process of step S218 is performed).

The CIS reading unit 106 starts reading at timing t7 when the quantity of light emitted from the light source 107 becomes stabilized (i.e., t7 is the timing at which the process of step S219 is performed for the first time). The light source 107 for reading the back side continues to be turned on until the CIS reading unit 106 reads the image data in the trailing end portion of the document 102. Control to turn off the light source 107 is performed at timing t8 (i.e., at which the process of step S222 is performed). The light source 107 is turned off at t9.

The CCD reading unit 114 continues to read the document 102 even after the CIS reading unit 106 ends reading. The light source 115 is turned off when the CCD reading unit 114 reads the final line of the document 102 at t10 (i.e., the process of step S309 has been performed). The light source 115 is turned off at t11.

As illustrated in FIG. 9A, the image reading apparatus according to the present exemplary embodiment twice performs control to turn on and off the light source 107 for reading the back side of the document 102. The light source 107 is turned on, first for reading the leading end portion of the document 102, and second for reading the trailing end portion of the document 102. The document 102 is conveyed starting from a start time ts and is continuously conveyed until the trailing end portion of the document 102 is separated from the sheet discharge roller 117.

Further, since the image data on the front side of the document 102 is read while the light source 107 is turned on, the quantity of light emitted from the light source 107 become clearly different from that of the light source 115. In other words, the light quantity is increased as compared to when normally reading the back side, so that the document is read using the transmitted light.

Figure 14A:
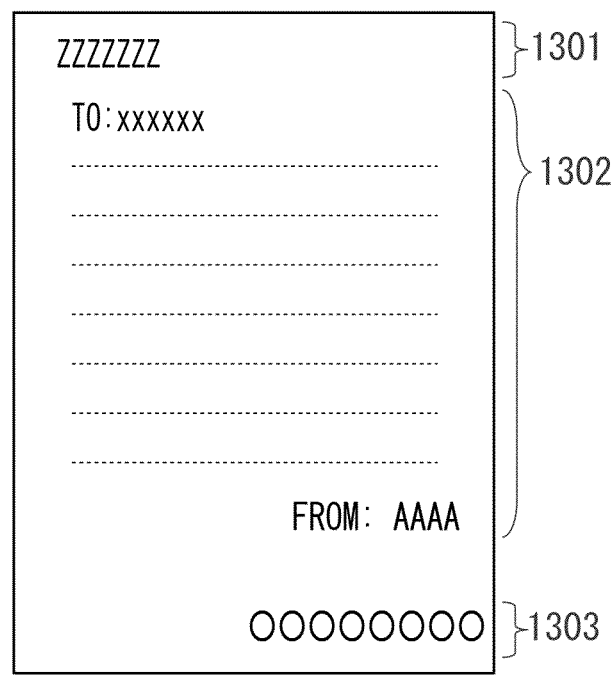
FIGS. 14A and 14B illustrate a region in a document on which color determination is performed when reading one side of the document according to an exemplary embodiment.
Figure 14B:
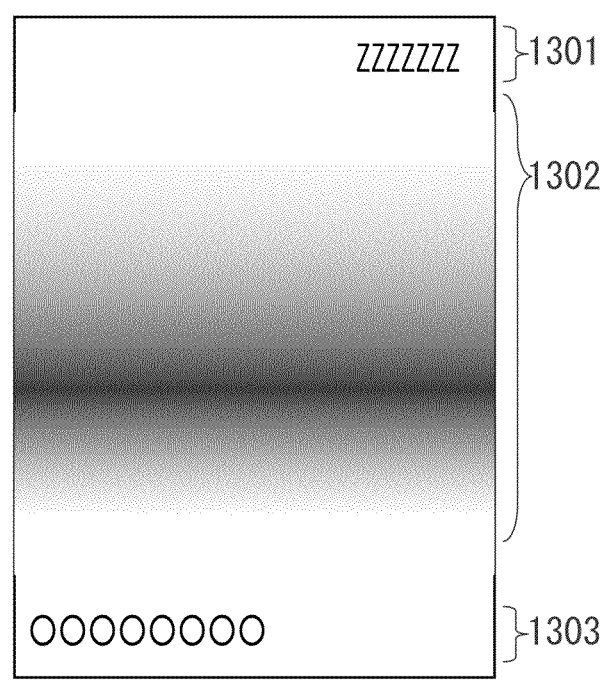

For example, if the image reading apparatus reads the image data illustrated in FIG. 14A, a reading result is acquired as illustrated in FIG. 14B. Referring to FIG. 14B, the leading end portion and the trailing end portion of the document 102 are read by turning the light source 107 on and increasing the light quantity. The image data on the front side of the document 102 can thus be read.

If the image data is color image data, the image data can be read at a level in which the result can be recognized as a color image, even when the image data is read using the transmitted light. The result can thus be used in color determination of the image. A region 1302 is a region in which the light source 107 is turned off, so that the transmitted document image data cannot be read.

Lighting control of the light source 107 and the light source 115 when reading two sides of the document image data will be described below with reference to FIG. 9B. Referring to FIG. 9B, T0, T1, T2, T3, T4, T5, T6, and T7 indicate time points at which the state of the light source 107 or the light source 115 changes. Furthermore, L0 indicates a maximum level of the light quantity of the light source 107, and L1 indicates a maximum level of the light quantity of the light source 115.

When two-sided reading is started (at Ts, i.e., reading start timing), the light source 107 for reading the back side of the document 102 is turned on at timing T0 (i.e., T0 is the timing at which the process of step S203 illustrated in FIG. 4 is performed). The CIS reading unit 106 then reads the image data on the back side of the document 102, starting at timing T1 at which the quantity of light emitted from the light source 107 for reading the back side becomes stable (i.e., T1 is the timing at which the process of step S205 is performed for the first time).

At timing T2, the light source 115 for reading the front side of the document 102 is turned on (i.e., T2 is the timing at which the process of step S303 is performed). The CCD reading unit 114 reads the image data on the front side, starting at timing T3 at which the quantity of light emitted from the light source 115 for reading the front side becomes stable (i.e., T3 is the timing at which the process of step S305 illustrated in FIG. 5 is performed for the first time).

Reading control of the document 102 is then performed by maintaining the light quantities of the light source 107 and the light source 115 constant. The CIS reading unit 106 ends reading the back side of the document 102 at timing T4 (i.e., the detection timing in the process of step S207). The light source 107 for reading the back side then becomes turned off at timing T5 (i.e., the timing at which the process of step S208 is performed).

The CCD reading unit 114 ends reading the front side of the document at timing T6 (i.e., the detection timing in the process of step S307). The light source 115 for reading the front side then becomes turned off at timing T7 (i.e., the timing at which the process of step S309 is performed).

Figure 9B:
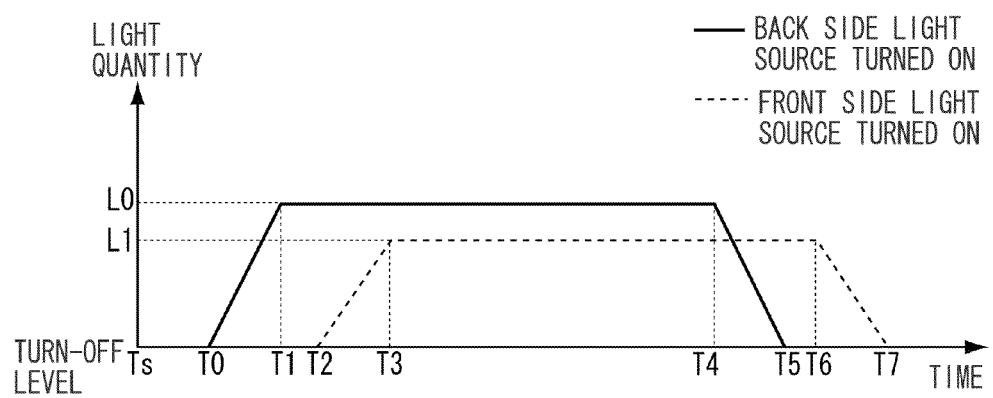

In FIG. 9B, the maximum light quantities of the light source 107 and the light source 115 are indicated as L0 and L1 whose values are different (i.e., L0>L1). However, it is not necessary for the light quantity of the light source 107 for reading the back side to be greater. The maximum values of the light quantities of the light source 107 and the light source 115 are determined as follows. The maximum values are determined within a range in which, when light is emitted to the document image data of the document 102, the image data on the side that is not being read is not input to the reading unit on the side to be read, due to the transmission of light through the document 102.

(Color Determination Operation)

Figure 6B:
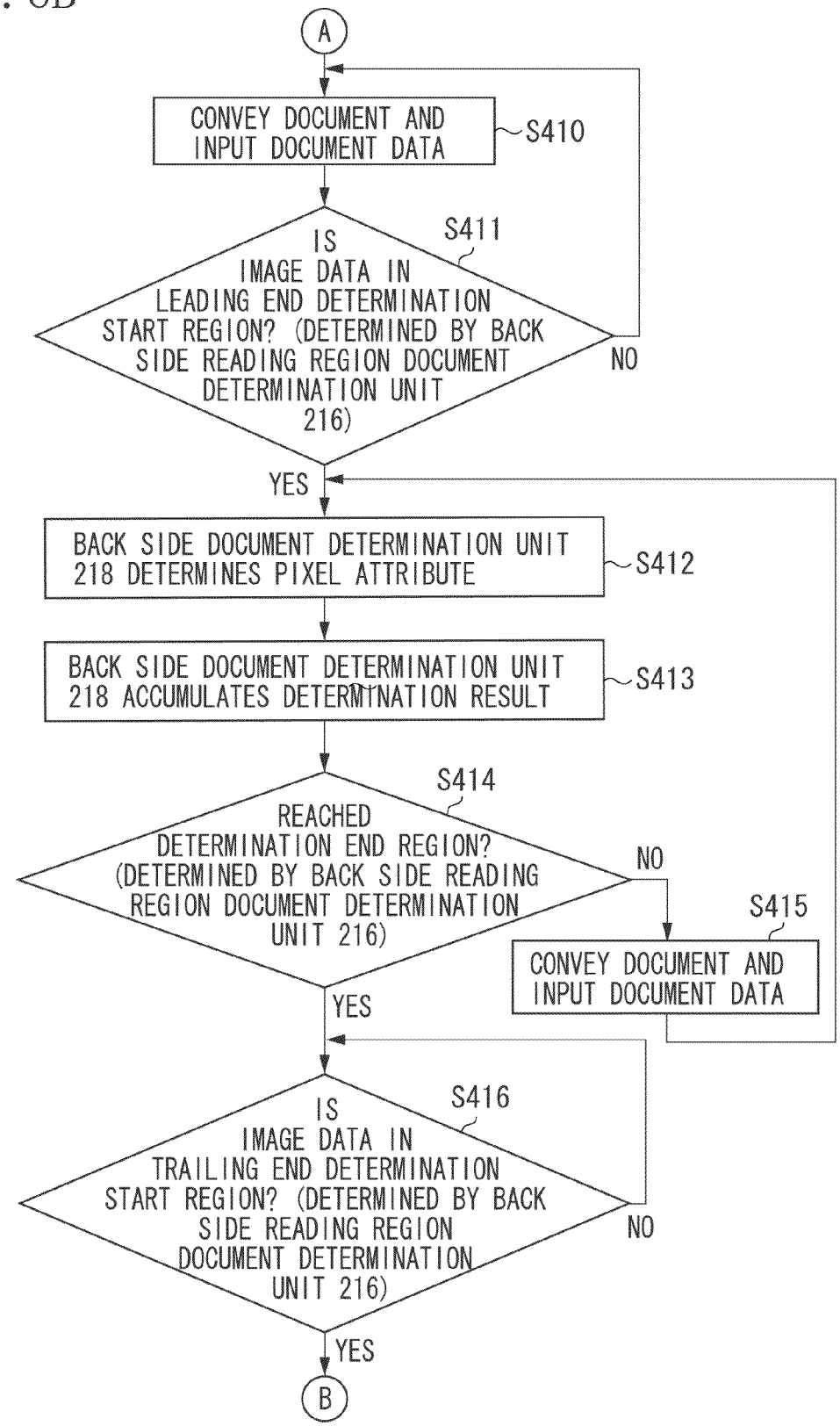
FIGS. 6 (6A, 6B, and 6C) is a flowchart illustrating a process for deciding on a color determination region and a color determination process according to an exemplary embodiment.
Figure 6C:
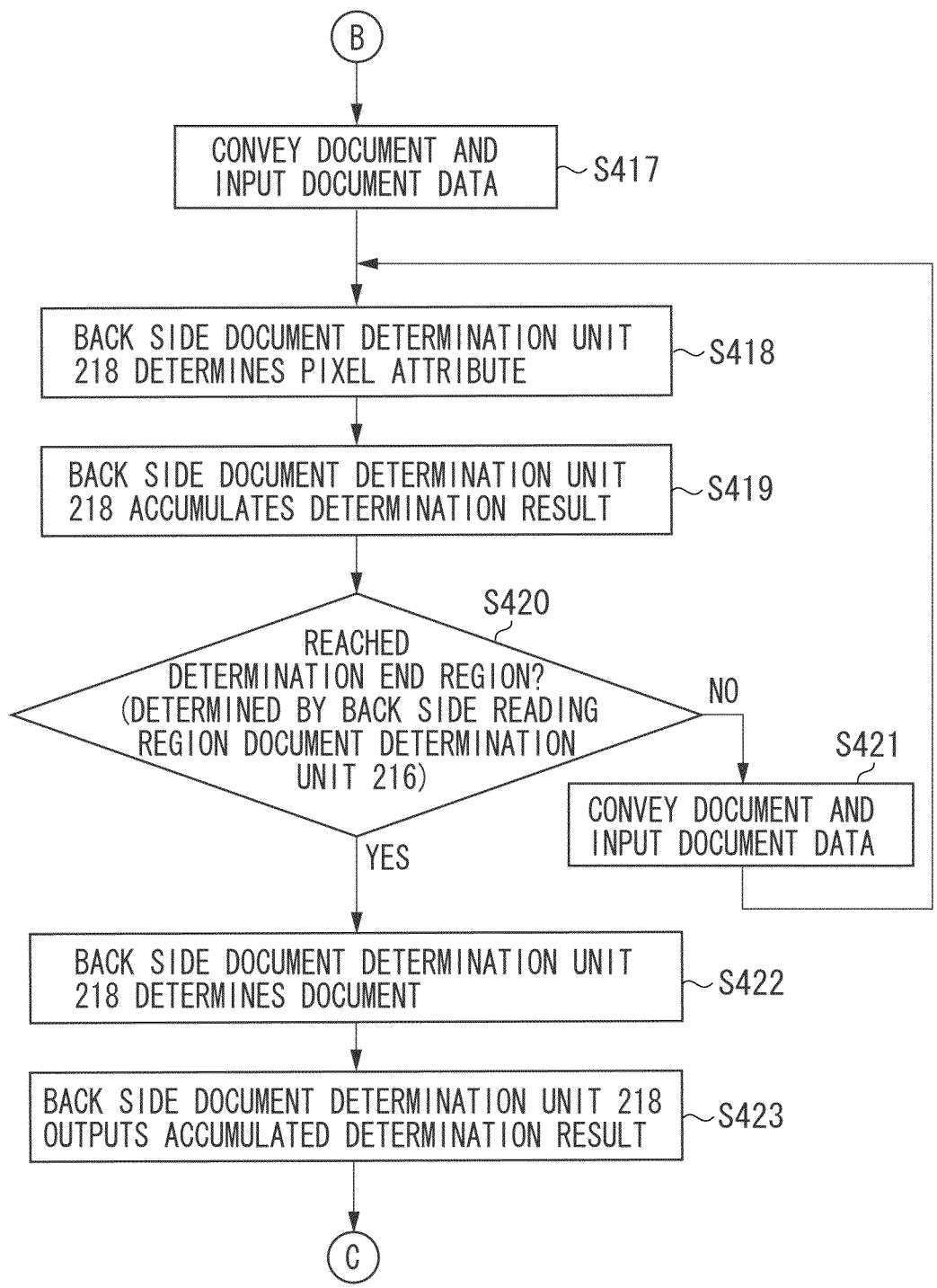

The color determination process performed on the document image data read by the CIS reading unit 106 will be described below with reference to FIG. 6. Each step in the flowchart illustrated in FIG. 6 is realized by the CPU (not illustrated) included in the control unit 120 executing a program read out from a memory (e.g., a ROM) in the control unit 120.

In the case of the two-sided reading mode, the control unit 120 controls the back side reading region document determination unit 216 so that the leading end and the trailing end portions among the document image data on the back side read by the CIS reading unit 106 are not used in the color determination. The back side document determination unit 218 thus performs color determination by excluding the leading end and the trailing end portions, according to the instruction from the control unit 120.

In the case of the one-sided reading mode, the control unit 120 controls the back side reading region document determination unit 216 so that the CIS reading unit 106 only reads the leading end and the trailing end portions of the document image data on the front side of the document in which there is the offset. The back side document determination unit 218 thus performs color determination on the leading end and the trailing end portions, according to the instruction from the control unit 120.

As a result of performing such processes, the effect of erroneously determining the document based on the leading end and the trailing end portions of the document due to conveyance control is improved. The image can be read at the reading position of the CIS reading unit 106 for reading the back side of the document 102 without the effect of shift and distortion caused by the conveyance rollers 109, 110, 111, and 112. A stable image can thus be acquired, as compared to reading the document using the CCD reading unit 114.

Referring to FIG. 6, in step S401, the control unit 120 determines the reading operation mode input to the operation unit 122 by the user. If the control unit 120 determines that the reading operation mode input by the user is the two-sided reading mode (NO in step S401), the controller unit 120 outputs to the related components, the instruction to convey the document mounted on the document mounting unit 101. Upon receiving the instruction, the sheet feed roller 104 or the related conveyance roller starts conveyance control.

In step S402, the control unit 120 conveys the document 102 on the conveyance path 103, and the CIS reading unit 106 outputs the image data read from the back side of the document 102 converted to the electrical signal.

In step S403, upon input of the image data read from the back side of the document 102, the back side reading region document determination unit 216 determines whether the image data is in the region of the image data for performing document determination, according to the instruction from the control unit 120. If the back side reading region document determination unit 216 detects that the determination region has been reached (YES in step S403), the back side reading region document determination unit 216 outputs the input image data to the subsequent back side document determination unit 218.

As described above, if the conveyance path in the image reading apparatus is curved as illustrated in FIG. 1, conveyance of the leading end and the trailing end portions of the document becomes unstable at the reading position of the CCD reading unit 114 in the image reading apparatus. As a result, color misregistration is generated when performing reading control. The leading end and the trailing end portions of the document image are thus not input to the front side document determination unit 209 when reading the front side of the document.

Such a process is performed by the front side reading region document determination unit 207 according to an instruction from the control unit 120. FIG. 13 illustrates an example of a region determination by the front side reading region document determination unit 207.

Referring to FIG. 13, a main scanning direction of the document image data is indicated in the horizontal direction, and a sub-scanning direction of the document image data is indicated in the vertical direction. A shaded region 1202 in document image data 1201 indicates a region that the front side reading region document determination unit 207 outputs to the subsequent front side document determination unit 209.

The front side reading region document determination unit 207 does not output to the front side document determination unit 209 a number of pixels in the leading end 1203 that corresponds to the range of the leading end portion when document reading control is performed. Further, the front side reading region document determination unit 207 does not output to the front side document determination unit 209 a number of pixels in the trailing end 1204 that corresponds to the range of the trailing end portion when performing document reading control.

Furthermore, regions 1205 and 1206 illustrated in FIG. 13 indicate mask regions on left and right end portions of the document. The mask regions 1205 and 1206 are set to avoid an effect of punched holes in the reading document or shadows in the right and left ends that are generated when reading the document, not to avoid color misregistration caused by conveyance control.

In step S404 illustrated in FIG. 6, the back side document determination unit 218 determines for each pixel whether the input image data is color image data, according to an instruction from the control unit 120. In step S405, the back side document determination unit 218 accumulates the determination result.

In step S406, the back side reading region document determination unit 216 determines whether all of the image data in the document determination region has been input. If the back side reading region document determination unit 216 determines that not all of the image data in the document determination region has been input (NO in step S406), the process proceeds to step S407. In step S407, the back side document determination unit 218 performs a similar process on the image data input in synchronization with conveyance control. If the back side reading region document determination unit 216 determines that all of the image data in the document determination region has been input (YES in step S406), the process proceeds to step S408. In step S408, the back side document determination unit 218 determines an attribute of the document data in the read back side, i.e., whether the document is a color document or a monochrome document. In step S409, the back side document determination unit 218 stores the determination result.

On the other hand, if the reading operation mode is the one-sided reading mode (reading of the front side of the document) (YES in step S401), the control unit 120 outputs to the related components, an instruction to convey the document 102 mounted on the document mounting unit 101. Upon receiving the instruction, the sheet feed roller 104 or the related conveyance roller starts conveyance control.

In step S410, the control unit 120 conveys the document 102 on the conveyance path 103, and the CIS reading unit 106 outputs to the back side reading region document determination unit 216 the image data converted to the electrical signal.

The back side reading region document determination unit 216 then outputs to the subsequent back side document determination unit 218, only the leading end and the trailing end portions of the input document image data. Such regions as described above are regions at the leading end or the trailing end portions of the front side of the document 102 in which the conveyance speed of the document does not become stabilized. Such regions contain image information in which the front side of the document is offset.

In step S411, the back side reading region document determination unit 216 which is controlled by the control unit 120 thus determines whether the input image data is in the leading end determination start region. If the back side reading region document determination unit 216 determines that the input image data is in the leading end determination start region (YES in step S411), the subsequent image data is output to the subsequent back side document determination unit 218.

In step S412, the back side document determination unit 218 determines by pixel unit whether the input image data is color image data, according to the instruction of the control unit 120. In step S413, the back side document determination unit 218 accumulates the determination result. In step S414, the back side reading region document determination unit 216 determines whether all of the image data in the leading end portion in which the color determination of the document is to be performed has been input. If the back side reading region document determination unit 216 determines that not all the image data in the leading end portion in which the color determination of the document is to be performed has been input (NO in step 414), the process proceeds to step S415. In step S415, the back side document determination unit 218 performs the similar process on the input image data in synchronization with conveyance control. If the back side reading region document determination unit 216 determines that all of the image data in the leading end portion in which the color determination of the document is to be performed has been input (YES in step S414), the back side reading region document determination unit 216 again starts a masking process of the input image data.

In step S416, the back side reading region document determination unit 216 determines whether the image data that is input in synchronization with conveyance control has reached the determination start region of the trailing end portion. If the back side reading region document determination unit 216 determines that the input image data has reached the determination start region of the trailing end portion (YES in step S416), the process proceeds to step S417. In step S417, the back side reading region document determination unit 216 outputs the input image data to the back side document determination unit 218.

In step S418, the back side document determination unit 218 again determines by pixel unit whether the input image data includes color. In step S419, the back side document determination unit 218 accumulates the determination result by adding to the accumulation result of the leading end portion. In step S420, the back side reading region document determination unit 216 determines whether all of the image data in the determination region has been input. If the back side reading region document determination unit 216 determines that not all of the image data in the determination region has been input (NO in step S420), the process proceeds to step S421. In step S421, the back side document determination unit 218 performs a similar process on the image data input in synchronization with conveyance control.

If the back side reading region document determination unit 216 determines that all of the image data in the determination region has been input (YES in step S420), the process proceeds to step S422. In step S422, the back side document determination unit 218 determines an attribute of the document data, i.e., whether the document is a color document or a monochrome document. In step S423, the back side document determination unit 218 outputs to the front side document determination unit 209, the determination result as a determination result signal 219 illustrated in FIG. 2.

Figure 7:
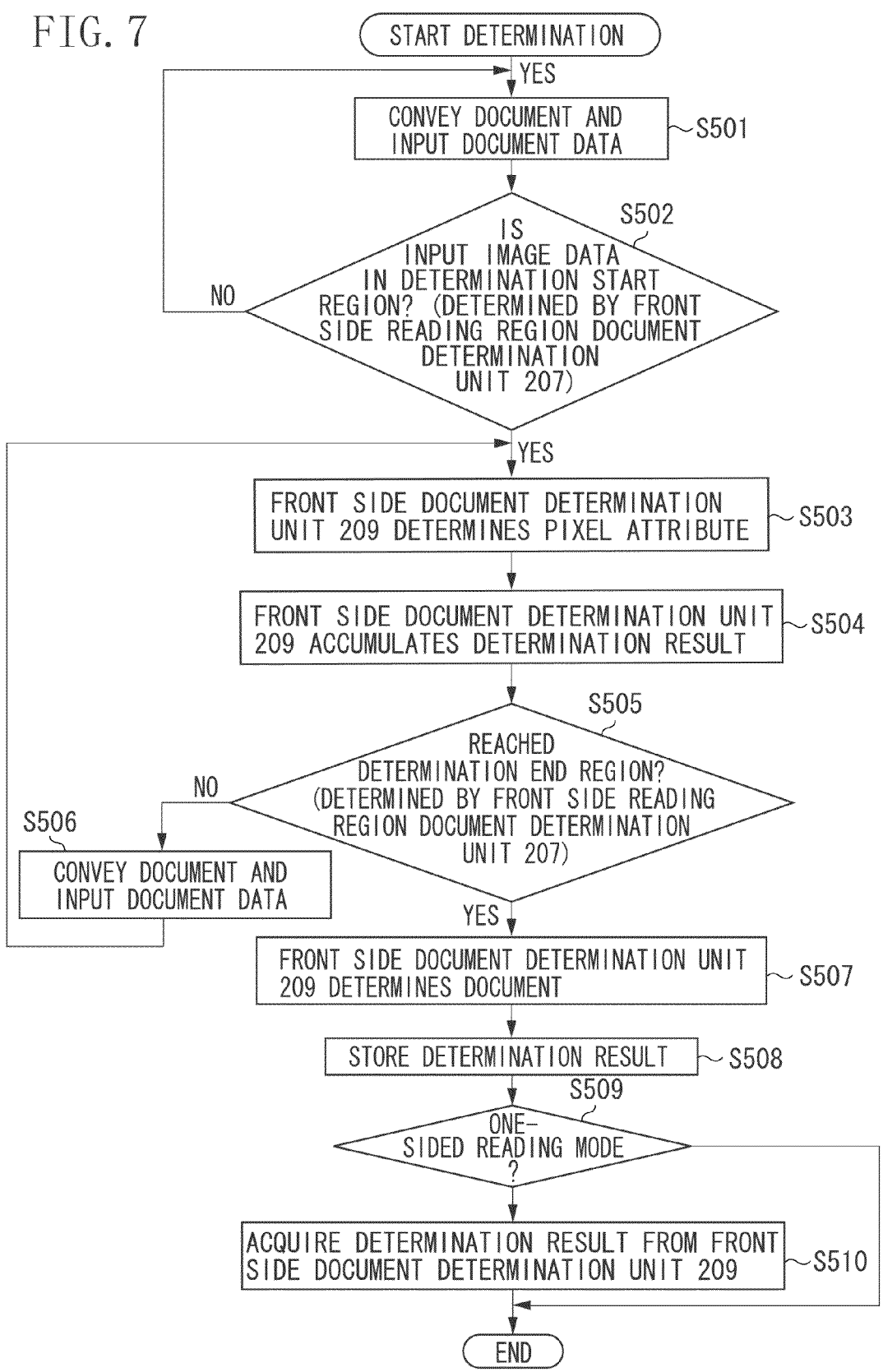
FIG. 7 is a flowchart illustrating a process for deciding on a color determination region and a color determination process according to an exemplary embodiment.

The process for controlling the front side document determination unit 209 that performs color determination of the image data acquired from the CCD reading unit 114 will be described below with reference to FIG. 7. Each step in the flowchart illustrated in FIG. 7 is realized by the CPU (not illustrated) included in the control unit 120 executing a program read out from a memory (e.g., a ROM) in the control unit 120.

When the reading operation is started, the control unit 120 instructs the sheet feed roller 104 to feed the document 102. The document feed roller 104 then picks up and places on the conveyance path 103, each page of the document 102 mounted on the document mounting unit 101.

In step S501, the document image data 102 is conveyed to the reading position by document conveyance control, and the document image data is input. In step S502, the front side reading region document determination unit 207 determines whether the input image data is to be used in document determination.

More specifically, if the front side of the document is to be read, the front side reading region document determination unit 207 determines whether to output to the subsequent front side document determination unit 209 the read image data that has been input. In the case of the one-sided reading mode, such a determination is based on whether the image data region is in the region excluding the leading end portion of the document (i.e., the region 1202 illustrated in FIG. 12) described above.

If the front side reading region document determination unit 207 determines that the input image data is in the document determination region (YES in step S502), the front side reading region document determination unit 207 outputs the input image data as the image data 208 to be used in determination, according to the instruction from the control unit 120. In step S503, the front side document determination unit 209 performs determination using the input image data, i.e., determines the attribute for each input pixel. In step S504, the front side document determination unit 209 accumulates the determination result.

In step S505, the front side reading region document determination unit 209 determines whether all of the input image data has been determined. If the front side reading region document determination unit 207 determines that not all the input image data has been determined (NO in step S505), the process proceeds to step S506. The front side document determination unit 209 then repeatedly performs determination control on all of the image data input via the front side reading region document determination unit 207, according to the instruction from the control unit 120.

If the front side reading region document determination unit 207 determines that determination control of all of the image data has been completed (YES in step S505), the process proceeds to step S507. In step S507, the front side document determination unit 209 determines the input document image data. In step S508, the front side document determination unit 209 stores the determination result. In step S509, the control unit 120 determines the document reading mode. If the document reading mode is the one-sided reading mode (YES in step S509), the process proceeds to step S510. In step S510, the front side document determination unit 209 acquires the determination signal 219 output from the back side document determination unit 218.

Figure 8:
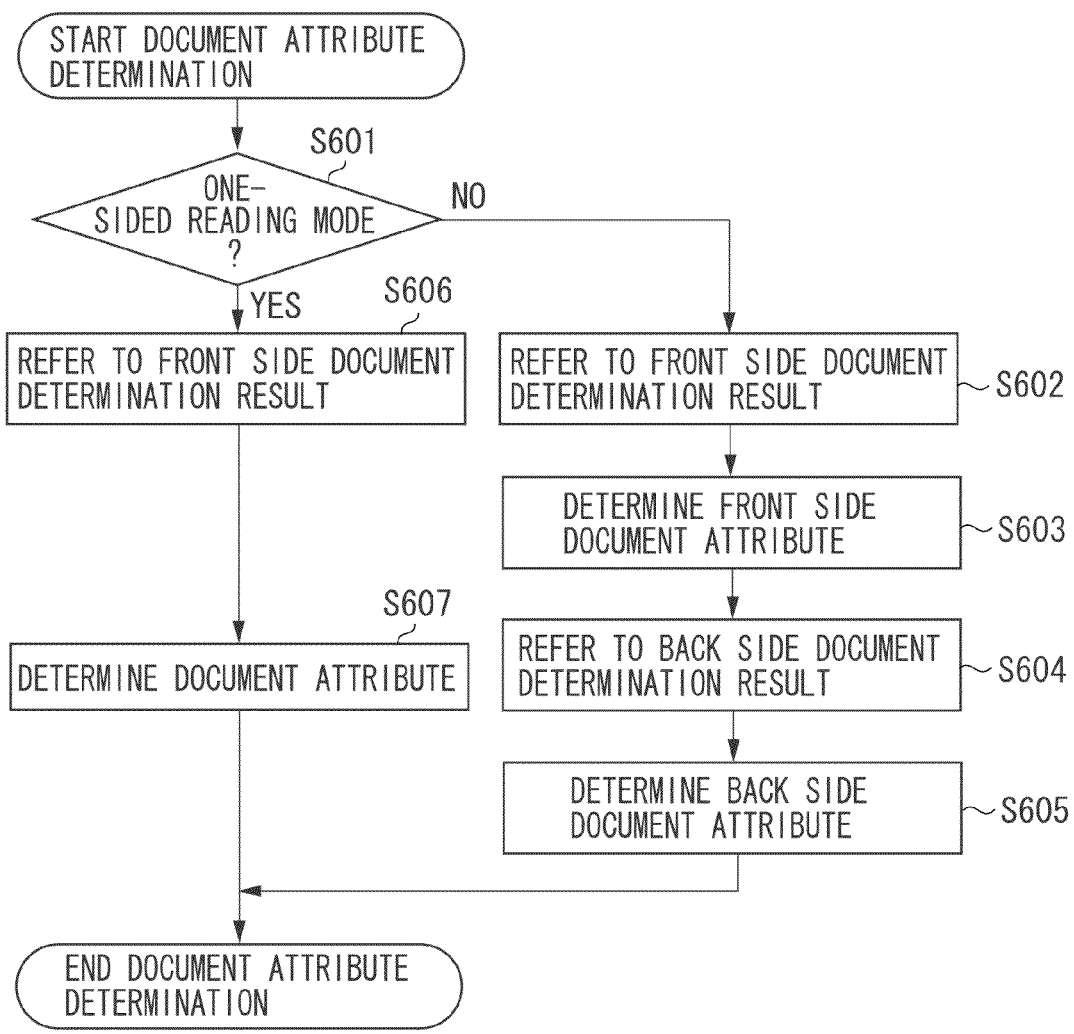
FIG. 8 is a flowchart illustrating a process for performing a final color determination of a document according to an exemplary embodiment.

The final color document determination performed by the control unit 120 will be described below. FIG. 8 is a flowchart illustrating a process performed by the control unit 120 when the document 102 has been read. Each step in the flowchart illustrated in FIG. 8 is realized by the CPU (not illustrated) included in the control unit 120 executing a program read out from a memory (e.g., a ROM) in the control unit 120.

In the case where the image data on both sides of the document 102 is to be read, the control unit 120 performs, when acquisition of the read image data has been completed, control according to the reading mode. In step S601, the control unit 120 determines the document reading mode. If the control unit 120 determines that the reading mode is the two-sided reading mode (NO in step S601), the control unit 120 refers to the color determination results stored in each of the front side document determination unit 209 and the back side document determination unit 218. In step S602, the control unit 120 refers to the determination result of the front side document determination unit 209. In step S603, the control unit 120 then determines whether the image in the front side of the document includes color.

In step S604, the control unit 120 refers to the back side document determination unit 218. In step S605, the control unit 120 determines whether the image in the back side of the document includes color. The results of the determination performed by the control unit 120 are used in selecting the parameters for later performing image processing of the document image data.

On the other hand, if the control unit 120 determines that the reading mode is the one-sided reading mode (i.e., front side reading) (YES in step S601), the process proceeds to step S606. In step S606, the control unit 120 refers to the determination result stored in the front side document determination unit 209, and determines whether the image in the front side of the document includes color. The result stored in the front side document determination unit 209 reflects the determination result of the back side document determination unit 218 in the one-sided reading mode (i.e., front-side reading).

In step S607, the control unit 120 performs, by referring to the document determination result stored in the front side document determination unit 209, the final color determination of the one-sided document image data.

If the image in the document includes a color pixel, the control unit 120 determines that the document is a color document. On the other hand, if the image in the document does not include a color pixel, the control unit 120 determines that the document is a monochrome document instead of a color document.

The determination result of the control unit 120 is used in selecting the parameters for performing subsequent image processing of the document image data.

When performing one-sided reading (front side reading), the above-described control allows the reading unit for reading the image data on the back side of the document, to be used in acquiring the image data in the region in which the image data to be read becomes unstable due to mechanical restrictions.

According to the present exemplary embodiment, in a case where the reading apparatus performs one-sided reading, the reading apparatus uses the back side reading unit to read the image data in a portion in which reading errors may occur when read by the front side reading unit. Determination accuracy is thus improved. Further, lighting control is performed on the light source limited to a region to be read by the back side reading unit, and the quantity of light emitted from the light source is adjusted according to the paper type of the document image data. As a result, excessive power consumption can be reduced.

Furthermore, according to the present exemplary embodiment, the CIS reading unit 106 facing the back side of the document is used in the one-sided reading mode to read the leading end and the trailing end portions of the front side of the document. However, it is not limited thereto, and the CIS reading unit 106 may read the entire front side of the document.

Moreover, according to the present exemplary embodiment, color document determination is performed by appropriately controlling the lighting position or the light quantity of the light sources for reading the front side and the back side of the document. It is thus not necessary to extract the color difference component and accumulate the determination results for each pixel for performing document determination, and other methods may also be used.

Further, according to the present exemplary embodiment, it is determined whether the document is a monochrome document that includes a black and white image, or a color document that includes a color image. However, this is not limited thereto, and the embodiments may be used for determining whether the document includes white and blue images or other colors. In such a case, other methods may be employed, such as separating the read image information to a luminance component and the color difference component, or determining each pixel based on an intensity of each of red, green, and blue colors.

According to the first exemplary embodiment, color determination of the document and deciding on the region in the document to be used in color determination are performed by the front side document determination unit 209, the back side document determination unit 218, the front side reading region document determination unit 207, and the back side reading region document determination unit 216 in the processing circuit 122.

According to another exemplary embodiment, the processes are not limited to being performed by the above-described components. The processes may be realized by the CPU in the control unit 120 executing programs stored in a memory in the control unit 120 for performing the processes illustrated in FIG. 6 and FIG. 7.

For example, the CPU in the control unit 120 mainly executes each of the processes in step S403 to step S406, step S408, step S411 to step S414, step S417 to step S420, and step S422 illustrated in FIG. 6. Further, the CPU in the control unit 120 mainly executes each of the processes in step S502 to step S505, step S507, and step S510 illustrated in FIG. 7.

Further, the embodiments may be applied to apparatuses other than the image reading apparatus including the front side reading sensor and the back side reading sensor described in the first exemplary embodiment. For example, the embodiments may be applied to an image reading apparatus that does not include a reading sensor for reading the back side as illustrated in FIG. 1.

In such a case, the CCD reading unit 114 reads the region other than the leading end and the trailing end portions of the front side of the document. The sheet discharge roller 117 and the conveyance rollers 109, 110, 111, and 112 are then inversely rotated, so that the document is conveyed in an opposite direction. The trailing end portion of the document 102 is thus read by the CCD reading unit 114.

In the above-described example, the same CCD reading unit 114 reads the trailing end portion. However, the conveyance path 103 when the document 102 passes through the reading unit 114 is different. Referring to FIG. 1, a portion of the conveyance path 103 around the sheet discharge roller 117, and the conveyance rollers 112 and 111 is not curved as compared to the portion of the conveyance path 103 around the conveyance rollers 109, 110, and 111. The reading error caused by conveyance may thus be reduced at least in the trailing end portion of the document 102.

Furthermore, two reading units may be disposed at positions facing the front side of the document. In such a case, the document is read by a reading unit in which less reading error is generated with respect to a region in the document, so that the reading error due to conveyance may be reduced.

Moreover, the determination accuracy in the embodiments may be further improved when the document is a one-sided document, in which one side includes the information to be read and the other side is blank. The embodiments may be applied to reading a one-sided document even when the back side is not blank.

The embodiments are applicable to a document reading system including a plurality of external apparatuses, each of which includes a portion of the apparatus.

Further, according to the first exemplary embodiment, the front side of the document (i.e., an example of a first side) is the side which is facing upwards when the document is set on the document stage. In such a case, the image on the front side (i.e., an image on the first side) is read by the CCD reading unit 114 (i.e., a first reading unit).

Furthermore, according to the first exemplary embodiment, the back side of the document (i.e., an example of a second side) is the side which is facing downwards when the document is set on the document stage. In such a case, the image on the back side (i.e., an image on the second side) is read by the CIS reading unit 106 (i.e., a second reading unit). Moreover, the CIS reading unit 106 (the second reading unit) reads the light transmitted through the front side of the document by increasing the light quantity of the light source.

Aspects can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the embodiments. In an example, a computer-readable medium may store a program that causes an image reading apparatus to perform a method described herein. In another example, a central processing unit may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-027918 filed Feb. 10, 2010, which is hereby incorporated by reference herein in its entirety.

What is claimed is:

1. An image reading apparatus, comprising:
    a first reading unit configured to read an image on a first side of a document conveyed through a document conveyance path;
    a second reading unit configured to read an image on a second side which is different from the first side on the document conveyed through the document conveyance path;
    a control unit configured to control the second reading unit to read, from the second side of the document, an image in a first region on the first side of the document and control the first reading unit to read an image in a second region on the first side, wherein the second region of the first side is different from the first region of the first side; and
    a determination unit configured to determine whether a color image is included in the image on the first side according to the image in the first region on the first side read by the second reading unit from the second side of the document and the image in the second region on the first side read by the first reading unit.

2. The image reading apparatus according to claim 1, wherein the first reading unit reads the image in the second region using light reflected from the first side of the document, and the second reading unit reads the image in the first region using light transmitted through the first side of the document.

3. The image reading apparatus according to claim 1, wherein the first region is started from a leading end, in a document conveying direction, of the document conveyed through the document conveyance path.

4. The image reading apparatus according to claim 1, wherein the second reading unit reads an image on a second side of a document by reading light emitted from a light source to the document, and
    wherein the light source emits a quantity of light to the document when reading light transmitted through the first side of the document that is greater than a quantity of light emitted to the document when reading a second side of the document.

5. The image reading apparatus according to claim 4, wherein the light source emits a reduced quantity of light to the document during a period other than a period in which the second reading unit reads an image in a region that is different from the first region.

6. The image reading apparatus according to claim 1, wherein, after the control unit controls the second reading unit to read, from the second side of the document, an image in the first region on the first side of the document and controls the first reading unit to read an image in the second region following the first region of the first side, the control unit further controls the second reading unit to read, from the second side of the document, an image in a third region following the second region on the first side of the document.

7. A control method for controlling an image reading apparatus, the control method comprising:
    reading, using a first reading unit, an image on a first side of a document conveyed through a document conveyance path;
    reading, using a second reading unit, an image on a second side which is different from the first side on the document conveyed through the document conveyance path;

controlling the second reading unit to read, from the second side of the document, an image in a first region on the first side of the document and controlling the first reading unit to read an image in a second region on the first side, wherein the second region of the first side is different from the first region of the first side; and determining whether a color image is included in the image on the first side according to the image in the first region on the first side read by the second reading unit from the second side of the document and the image in the second region on the first side read by the first reading unit.

8. A non-transitory computer-readable medium storing a program that causes an image reading apparatus to perform the control method according to claim 7.

\* \* \* \* \*